(12) United States Patent
Dasgupta et al.

(10) Patent No.: US 10,296,652 B2
(45) Date of Patent: May 21, 2019

(54) METHOD AND SYSTEM FOR SELECTION OF USER INTERFACE RENDERING ARTIFACTS IN ENTERPRISE WEB APPLICATIONS USING A MANIFEST MECHANISM

(71) Applicant: Oracle International Corporation, Redwood Shores, CA (US)

(72) Inventors: Chandan Dasgupta, Kolkata (IN); Darshan Kumar, San Ramon, CA (US); Azahar Uddin, Varanasi (IN); Darshan Herga, Bangalore (IN); Anil Billapati, Milpitas, CA (US); Anbalagan Karuppannan, Namakkal (IN); Vishal Balagangadhar, Bangalore (IN); Ashish Narang, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 376 days.

(21) Appl. No.: 14/493,311

(22) Filed: Sep. 22, 2014

(65) Prior Publication Data
US 2015/0089377 A1  Mar. 26, 2015

Related U.S. Application Data

(60) Provisional application No. 61/880,918, filed on Sep. 21, 2013.

(51) Int. Cl.
*H04L 29/08* (2006.01)
*G06F 17/30* (2006.01)

(52) U.S. Cl.
CPC ........ *G06F 17/30899* (2013.01); *H04L 67/02* (2013.01); *H04L 67/322* (2013.01)

(58) Field of Classification Search
CPC .. G06F 17/30899; H04L 67/02; H04L 67/322
See application file for complete search history.

(56) References Cited

U.S. PATENT DOCUMENTS

| | | | | |
|---|---|---|---|---|
| 6,069,625 A * | 5/2000 | Nielsen | ............... | G06F 17/3089 707/E17.116 |
| 7,340,718 B2 * | 3/2008 | Szladovics | ............ | G06F 9/4443 717/106 |
| 7,529,792 B2 * | 5/2009 | Dietl | ................. | G06F 17/30899 709/201 |
| 7,761,844 B2 * | 7/2010 | Bove | ......................... | G06F 8/35 707/829 |
| 8,938,712 B2 * | 1/2015 | Bostian | ..................... | G06F 8/47 717/106 |
| 9,342,386 B1 * | 5/2016 | Sargent | ................... | G06F 17/30 |

(Continued)

*Primary Examiner* — Dino Kujundzic
(74) *Attorney, Agent, or Firm* — Sheppard Mullin Richter & Hampton LLP

(57) ABSTRACT

A method, system, and computer-program product for the selection of user interface rendering artifacts in web applications using a manifest mechanism are disclosed. The method includes receiving a request, evaluating an expression, and generating a physical renderer. The request is received at a manifest engine, and comprises a request for a physical renderer. The evaluating is performed by the manifest engine. The physical renderer is generated by the manifest engine, and the manifest engine is configured to generate the physical renderer based on a result of the evaluating.

18 Claims, 19 Drawing Sheets

(56) References Cited

U.S. PATENT DOCUMENTS

| | | | | |
|---|---|---|---|---|
| 10,108,592 B1* | 10/2018 | Meschkat | ............ | G06F 17/2247 |
| 2004/0258089 A1* | 12/2004 | Derechin | ................... | G06F 9/54 |
| | | | | 370/465 |
| 2007/0192818 A1* | 8/2007 | Bourges-Sevenier | ........................ | |
| | | | | H04L 12/2803 |
| | | | | 725/132 |
| 2010/0268736 A1* | 10/2010 | Ruhlen | ............. | G06F 17/30905 |
| | | | | 707/770 |
| 2014/0035945 A1* | 2/2014 | Anglin | ....................... | G06F 3/14 |
| | | | | 345/619 |
| 2015/0089349 A1* | 3/2015 | Duplessis | ............... | H04L 67/10 |
| | | | | 715/234 |

\* cited by examiner

User Interface Architecture
500

User Interface Architecture
800

METHOD AND SYSTEM FOR SELECTION OF USER INTERFACE RENDERING ARTIFACTS IN ENTERPRISE WEB APPLICATIONS USING A MANIFEST MECHANISM

CROSS-REFERENCE TO RELATED APPLICATIONS

The present patent application claims priority to Provisional Patent Application Ser. No. 61/880,918, filed Sep. 21, 2013, and entitled "Method And System For Selection Of User Interface Rendering Artifacts In Enterprise Web Applications Using A Manifest Mechanism," which is hereby incorporated by reference herein, in its entirety and for all purposes.

FIELD OF THE INVENTION

The present invention relates to user interface rendering, and, more particularly, to a method and system for the selection of user interface rendering artifacts in web applications using a manifest mechanism.

COPYRIGHT NOTICE/PERMISSION

Portions of this patent application contain materials that are subject to copyright protection. The copyright owner has no objection to the facsimile reproduction by anyone of the patent document, or the patent disclosure, as it appears in the Patent and Trademark Office file or records, but otherwise reserves all copyright rights whatsoever.

BACKGROUND OF THE INVENTION

As digital sources of information have become increasingly important in the business, academic and personal computing arenas, improved mechanisms for quickly and efficiently implementing new functionality in the applications that manage and present such information have also become increasingly important.

That being the case, the use of the Internet and web have grown I important, particularly in view of the mobility of modern business, and life generally. To meet such needs, new technologies such as cloud storage and web-based interfaces have been developed. However, providing web interfaces for applications can be cumbersome and inefficient. Such interface download entire suite interfaces, or force a rigid set of interface elements on the user. Unfortunately, there are no systems that provide a facility to configure web user interfaces, particularly on a just-in-time basis, and even more particularly, on runtime conditions.

SUMMARY OF THE INVENTION

In one embodiment, a method, system, and computer-program product for the selection of user interface rendering artifacts in web applications using a manifest mechanism are disclosed. The method includes receiving a request, evaluating an expression, and generating a physical renderer. The request is received at a manifest engine, and comprises a request for a physical renderer. The evaluating is performed by the manifest engine. The physical renderer is generated by the manifest engine, and the manifest engine is configured to generate the physical renderer based on a result of the evaluating.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from concepts such as those disclosed herein and their broader aspects. Other aspects, inventive features, and advantages of systems according to the concepts disclosed herein will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

Figure 1A:
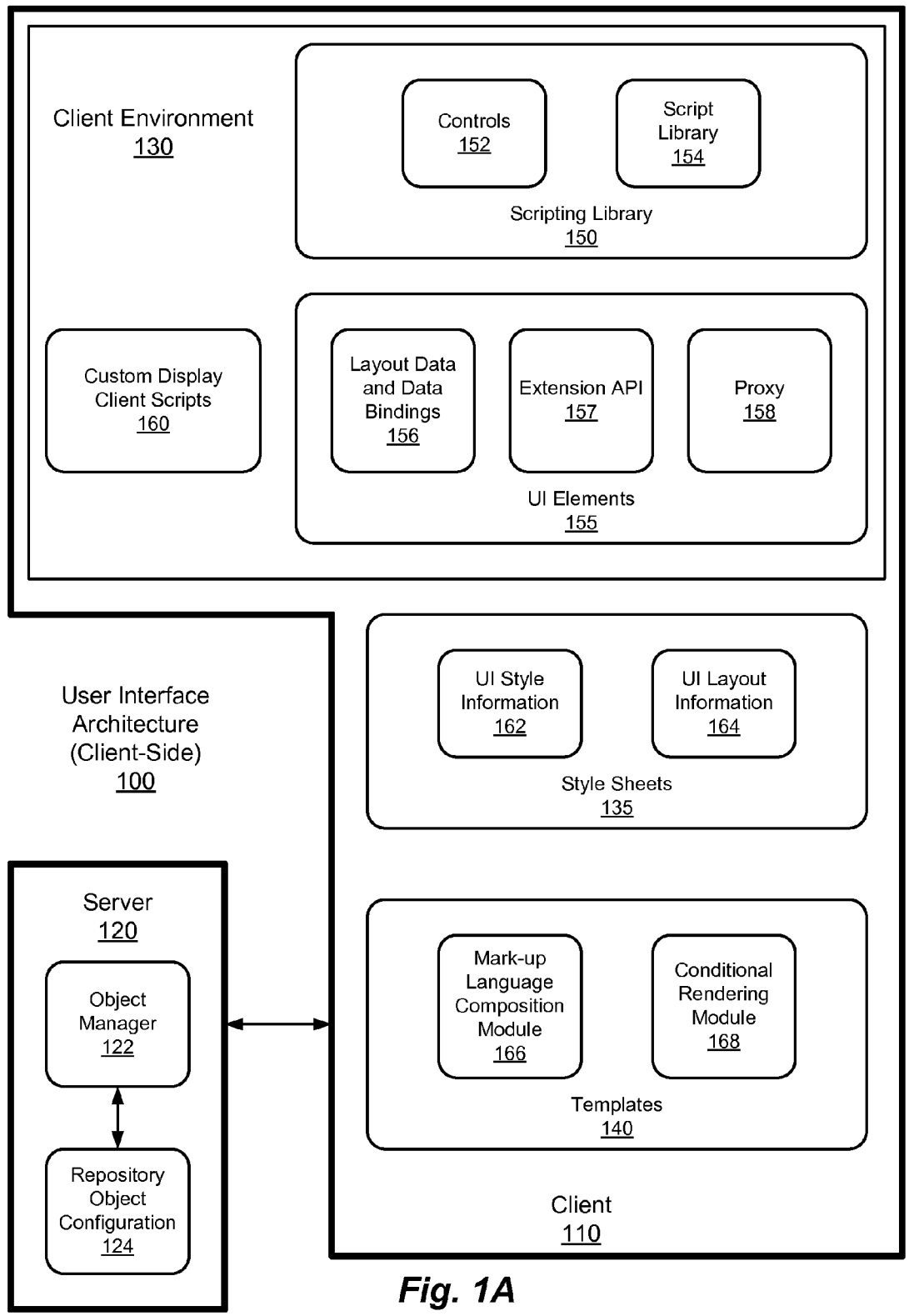
FIG. 1A is a simplified block diagram illustrating an example of a user interface architecture, focusing on the client side, according to embodiments of the methods and systems disclosed herein.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the systems described herein and equivalents thereof, as defined solely by the claims, will become apparent in view of the examples described in the detailed description set forth below.

DETAILED DESCRIPTION

Introduction

Systems such as those described herein provide methods and processes for the selection of user interface rendering artifacts in, for example, web applications using a manifest mechanism. Unfortunately, as noted, there are no systems that provide a facility to configure web user interface artifacts to be fetched and used on a just-in-time basis, particularly ones based on runtime conditions. In other systems, the use and selection of such artifacts is done in a hard-coded manner (directly in the source code), resulting in significant limitations as to operations and the functionality provided. If dynamic decision making is required, there has been no way to effect such mechanisms. Even if a static manifest mechanism were possible, such a mechanism would still fail to provide decision making such as that provided by systems such as those described herein, particularly where such systems base the provision of such functionality on dynamic conditions, and even more particularly, those existing at runtime.

An application framework such as that described herein can host a variety of applications, each having modules that are chosen and executed depending on dynamically varying conditions, such as the nature of the client device, the time of use, the business role of the user, and/or other such criteria/factors, alone or in combination with one another. Embodiments of systems employing a manifest according to embodiments of systems, such as those described herein, allow such systems to dynamically determine which specific mark-up language (e.g., HTML) rendering modules, JavaScript (JS) files, cascading style sheet (CSS) files, and other such user interface artifacts, as well as any other necessary or useful such artifacts, are needed to render the desired user interface at any given point in time.

Further, as used herein, a user interface according to embodiments of the methods and systems disclosed herein comprehends can be composed of several logical areas, including:
 The overall user interface (a composite of the rest), also called the application
 Views (composites of applets)
 Applets (which display transactional data)
 Navigation elements (also referred to herein as navigation tabs or navigation trees)
 Menus
 Toolbar An architecture according to embodiments of the methods and systems disclosed herein provides, among others, the following features:
 Declarative configuration of artifacts (e.g., web artifacts such as JS and CSS files), as well as templates and mark-up language-based renderers (e.g., HTML renderers).
 Dynamic, expression-based configuration of artifacts, providing the ability to specify conditions under which a particular artifact should be used, via an expression language, thus providing just in time usage of these artifacts.
 Ability to specify (and thus vary) artifacts used for different parts of the user interface, to the level of granularity of a typical application user interface component (e.g., form, list, menu, navigation tab, navigation tree, and the like). A significant feature of such an approach is the implementation of a strong underlying metadata infrastructure and expression evaluation infrastructure, which facilitates the writing of expressions based on static as well as dynamically-varying metadata, and therefore affords a flexible level of granularity (at the time of use, as well as over the lifetime of the user interface).

Example Architectures and Processes

FIG. 1A is a simplified block diagram illustrating an example of a user interface architecture, focusing on the client side, according to embodiments of the methods and systems disclosed herein, can be performed. Depicted in FIG. 1A is a user interface architecture (client-side) 100. The two primary elements of user interface architecture 100 depicted in FIG. 1A are a client 110 (e.g., a web browser and/or system executing same) and a server 120. Server 120 includes an object manager 122 and a repository object configuration 124. Object manager 122 is responsible for processing requests from client 110. Such requests can include requests for data, metadata (such as repository information), as well as performing other such functions. For example, in certain embodiments, object manager 122 (also referred to herein as an application object manager), upon receipt of such requests, determines information regarding the destination view, identifies business logic to be applied before and during the navigation, and identifies other information that may be related (and potentially necessary) to the display of that view. As part of these functions, object manager 122 accesses a repository object configuration 124. Repository object configuration 124 provides information, such as configuration parameters and the like, related to the display of data and other information based on repository information, in the affected screen/view/applet to be displayed. As will be appreciated in view of the present disclosure, information regarding the screen/view/applet (e.g., screen/view/applet definitions) can, for example, be maintained in an associated repository.

Turning now to client 110, components thereof depicted din FIG. 1A include a client environment 130, one or more style sheets (depicted in FIG. 1A as style sheets 135), and one or more templates (depicted in FIG. 1A as templates 140), among other possible such components. In turn, client environment 130 includes a scripting library 150 (which, in turn, includes controls 152 and a script library 154 (e.g., a JS Library)), user interface (UI) elements 155 (which, in turn, include layout data and data bindings 156, an extension application programming interface (API) 157 (e.g., a JS extension API), and a proxy 158 (e.g., a JS proxy)), and custom display client scripts 160 (e.g., one or more client browser scripts). An example of a scripting library such as scripting library 150 is a Java-based query library, such as a JQuery library. In such an implementation, controls 152 can be effected using JavaScript (JS) UI controls, while script library 154 can be implemented as a JS library. As will be appreciated, jQuery is a cross-platform JavaScript library designed to simplify the client-side scripting of HTML. jQuery's syntax is designed to simplify navigating a document, selecting elements, creating animations, handling events, and developing applications. jQuery also provides capabilities for developers to create plug-ins on top of a JS library. This enables developers to create abstractions for low-level interaction and animation, advanced effects and high-level, theme-able widgets. The modular approach to the jQuery library allows the creation of powerful dynamic web pages and web applications.

Also supported by client 110 are style sheets 135, which include a user interface (UI) style information and UI layout information 164. Client 110, in the depiction illustrated in FIG. 1A, also include templates 140, which, in turn, include a mark-up language composition module 166 and a conditional rendering module 168. While style sheets 135 and templates 140 are depicted in FIG. 1A as being included in client 110, it will be appreciated in light of the present disclosure that, in fact, such style sheets and templates are typically maintained on server 120 and downloaded to client 110 as part of the operations performed in a user interface architecture such as user interface architecture 100.

Similarly, in such embodiments, layout data and data bindings 156 can be implemented to interact with extension API 157 (e.g., a JS customization API) and a proxy such as proxy 158 (e.g., implemented by a JS proxy). In comparable fashion, custom display client scripts can be, for example, implemented by custom browser scripts. As will be appreciated in light of the present disclosure, the elements of scripting library 140 (e.g., controls 152 and script library 154) and UI elements 155 (e.g., layout data and data bindings 156, extension API 157 and proxy 158) represent objects that are configurable at runtime for the system. This is also true of UI style information 162 and UI layout information 164 of style sheets 135. Also configurable, though at design-time are the configurable objects represented by templates 140 (e.g., mark-up language composition module 166 and conditional rendering module 168) and repository object configuration 124. As will be further appreciated, custom display client scripts 160 can be either included (and, in some embodiments, generated) are runtime (and thus be considered runtime configurable objects), or can be configured at design-time (and thus be considered design-time configurable objects).

Figure 1B:
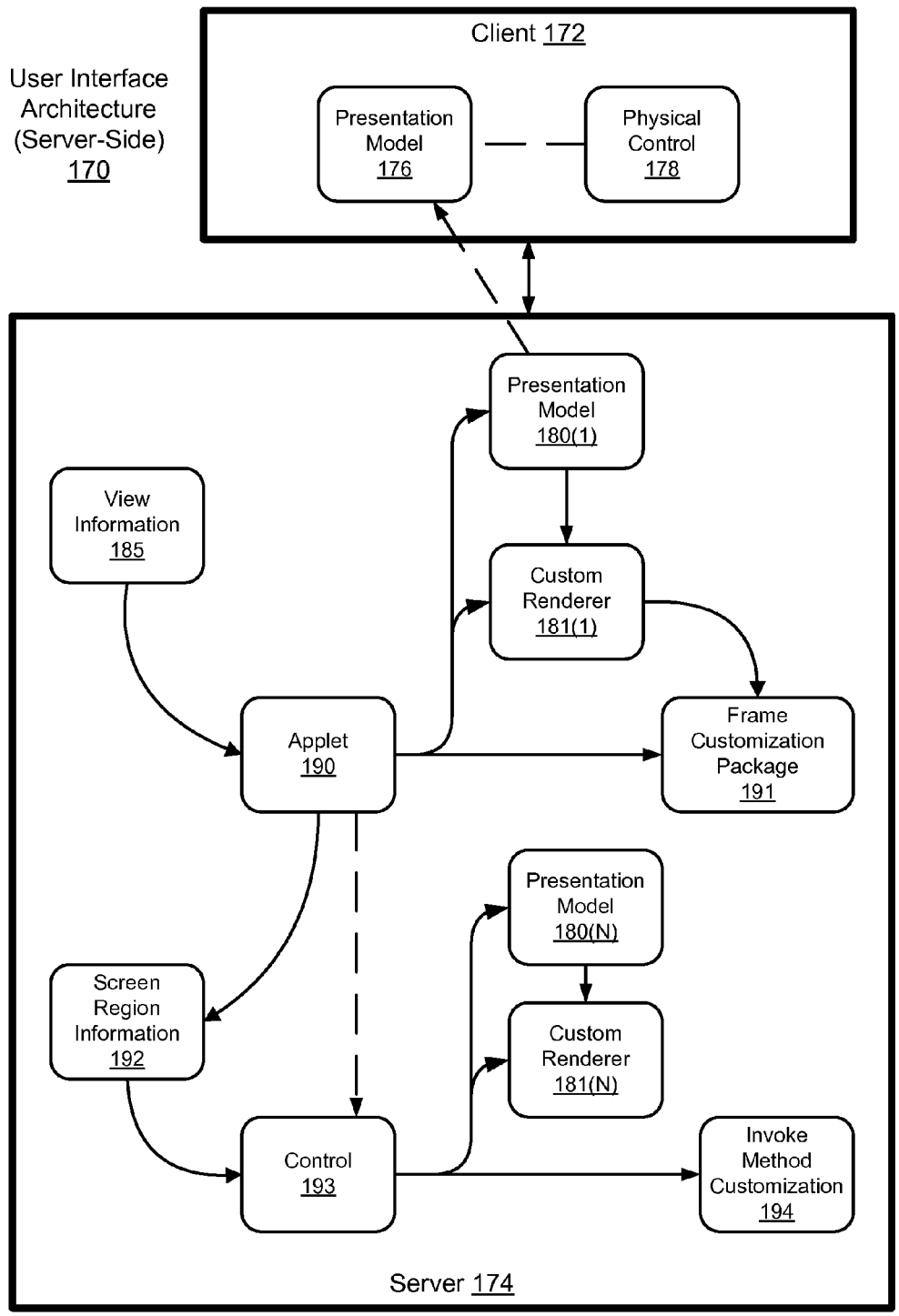
FIG. 1B is a simplified block diagram illustrating an example of a user interface architecture, focusing on the server side, according to embodiments of the methods and systems disclosed herein.

FIG. 1B is a simplified block diagram illustrating an example of a user interface architecture, focusing on the server side, according to embodiments of the methods and systems disclosed herein, can be performed. Illustrated in FIG. 1B is a user interface architecture (server-side) 170. User interface architecture 170 includes a client 172 and a server 174. As will be appreciated, the focus of the illustration in FIG. 1B is more detailed with regard to the server (server 174) rather than the client (client 172). Client 172 includes a presentation model 176 and a physical control 178, as examples of components thereof. Presentation model 176 can be implemented, in certain embodiments, using one or more scripts (e.g., such as a JS file), which determine the logic to be applied to data made available to client 172. As will be appreciated, in certain embodiments, the client-side scripting with which presentation model 176 can be implemented, allows for such scripting to be performed without requiring interaction with server 174 once such scripts have been made available to client 172. Functions that can be provided by presentation model 176 include the capture of client interaction (e.g., link activation, interaction with a screen control, and the like). Constructs such as presentation model 176 also provides for different logic processing (e.g., business logic) based on the hardware and software platform supporting client 172 (e.g., desktop, mobile device, operating systems, and so on). Presentation model 176 can be implemented using a collection of object properties and associated methods, and thus, can provide a logical abstraction layer of repository metadata. Further, while presentation model 176 need not perform rendering operations of physical mark-up language and/or style sheets, presentation model 176 can interact with server 174 if need be. As is also depicted in FIG. 1B, presentation model 176 is bound to physical control 178. Physical control 178 is used to render presentation model 176 as part of rendering the user interface elements that make up the user interface presented to the use. Display of physical control 178 is implemented to display a corresponding applet control, and renders the container for the metadata, data, and physical event bindings. Elements bound to physical control 178 include presentation model 176 (which results in the presentation model methods of present model 176 to physical control 178) and data (which provides access to the properties in presentation model 176).

Turning now to server 174, it will be appreciated that, as depicted in FIG. 1B, the presentation model maintained on client 172 (presentation model 176) is, in fact, created by components of user interface architecture 170 that exist at server 174. That being the case, server 174 is depicted as producing a number of presentation models (depicted in FIG. 1B as presentation models 180(1)-(N) and associated custom renderers (depicted in FIG. 1B as custom renderers 181(1)-(N). The presentation models 180 (1)-(N) and custom renderers 181(1)-(N) are generated by various mechanisms within server 174 in the case of presentation model 180(1) and custom renderer 181(1), view information 185 is used by an applet 190, which, in turn, generates presentation model 180(1) and custom renderer 181(1), as well as a frame customization package 191. Applet 190 also generates region information 192. Applet 190, either by way of region information 192 or directly, can generate, through its use of objects, rendering of user interface elements at the screen, view, applet or control level, for example. Server 174 can generate not only user interface elements such as applet 190, but can also generate other such user interface elements (e.g., as depicted in FIG. 1B, a control 193). As depicted in FIG. 1B, information regarding control 193, can be used to generate other elements such as presentation model 180(N) and custom renderer 181(N) as well as information that can be used in invoking method customization (e.g., depicted in FIG. 1B as invoke method customization 194). Invoke method customization 194 provides a mechanism that facilitates the invocation of custom script methods (e.g., JS methods, business services, or the like). For example, rendering customization in a manifest-based architecture permits the use frame customization, an equivalent customization, or to customize the physical renderer independently at any level of the object hierarchy, including at the sub-applet level for an applet control, and through the use of objects, allows rendering to occur at the screen, view, applet, or control level.

Figure 2:
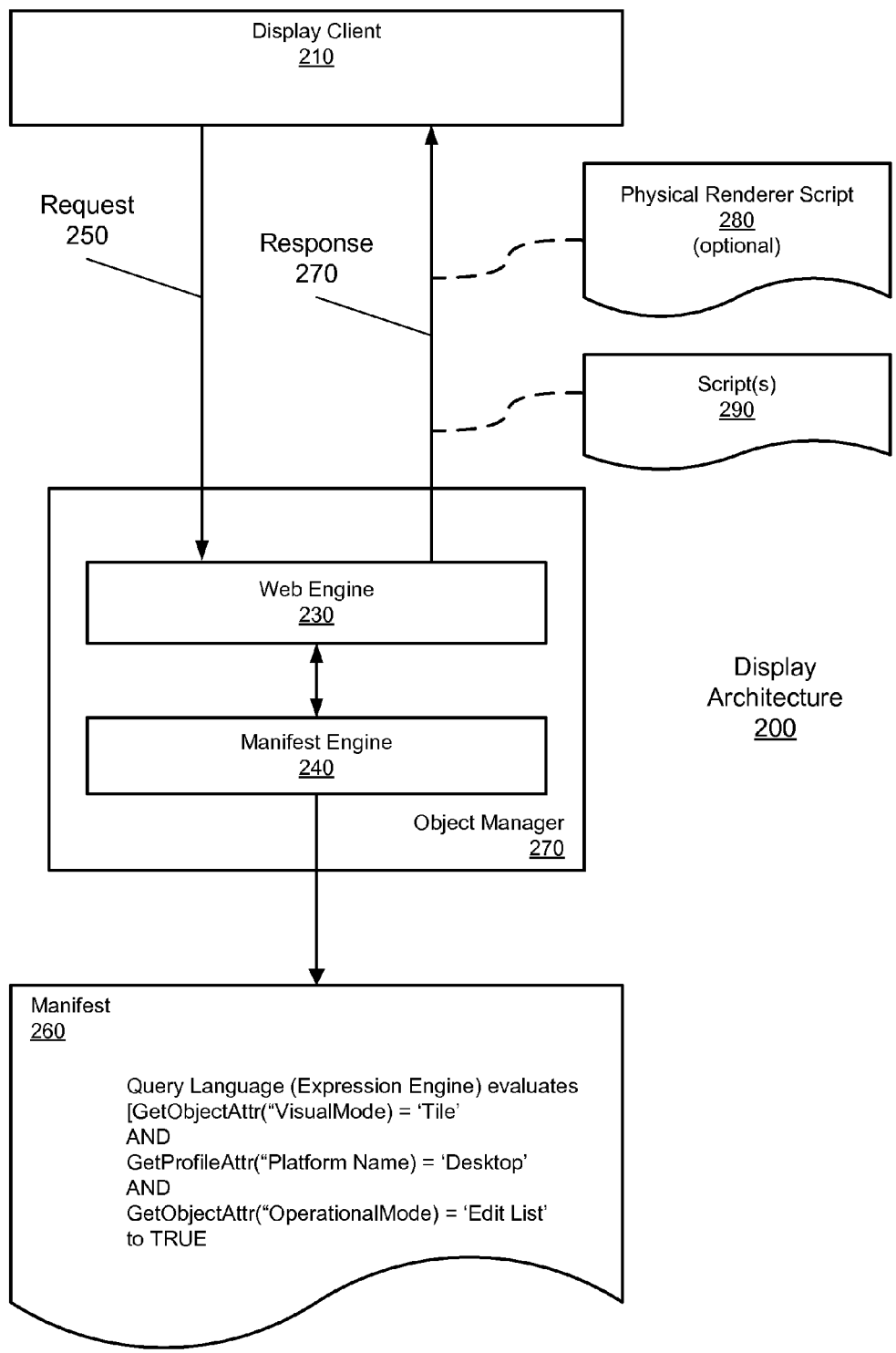
FIG. 2 is a simplified block diagram illustrating an example of a simplified display architecture, according to embodiments of the methods and systems disclosed herein.

FIG. 2 is a simplified block diagram illustrating an example of a simplified display architecture, according to embodiments of the methods and systems disclosed herein. FIG. 2 illustrates the major components of a display architecture 200, which include a display client 210 and an object manager 220. Object manager 220, in turn, comprises a web engine 230 and a manifest engine 240. As will be appreciated in light of the present disclosure, display client 210 provides functionality such as that illustrated in connection with client 110 of FIG. 1A and client 172 of FIG. 1B. That being the case, display client 210 sends a request 250 to object manager 220, and more specifically to web engine 230. Web engine 230 is responsible for, among other operations and administrative functions, executing client commands and facilitating the rendering of user interface elements.

Having received request 250, web engine 230 communicates with the manifest engine 240. Manifest engine 240 is tasked with functions such as reading one or more manifests (e.g., appropriate ones of the available manifest files), evaluating one or more of the object expressions stored therein, and providing the results of those evaluations to web engine 230. Thus, in display architecture 200, manifest engine 240 accesses a manifest 260 in order to make determinations as to the one or more user interface elements to be provided to display client 210 by object manager 220 (and more specifically, web engine 230). The requisite accesses and evaluation having been performed by manifest engine 240, manifest engine 240 communicates with web engine 230, proving information regarding the script files to be provided by web engine 230 to display client 210. In the scenario depicted in FIG. 2, web engine 230, as a result of information received from manifest engine 240, sends the requisite script file (or other comparable constructs) to display client 210. In the scenario depicted in FIG. 2, such scripts are sent to display client 210 in a response 270. Response 270 can be implemented using data sets, script files, and/or other such constructs. In the example depicted in FIG. 2, response 270 includes one or more optional physical renderer scripts (depicted in FIG. 2 as a physical renderer script 280) and one or more other scripts (depicted in FIG. 2 as script(s) 290). As noted earlier (in connection with FIG. 1B), the physical renderer produced and employed in the architectures described herein can be generated by a server (e.g., server 174 or object manager 220) or can be generated and installed on the client in question separately (and thus, pre-exist the process of manifest processing, for example, as described herein). Display client 210 uses the information on response 270 to render and present the desired user interface elements. The foregoing process thus allows flexible control over the user interface elements presented in response to such a request, as well as the manner in which such user interface elements are presented, their functionality, their operations, and other such characteristics.

Figure 3:
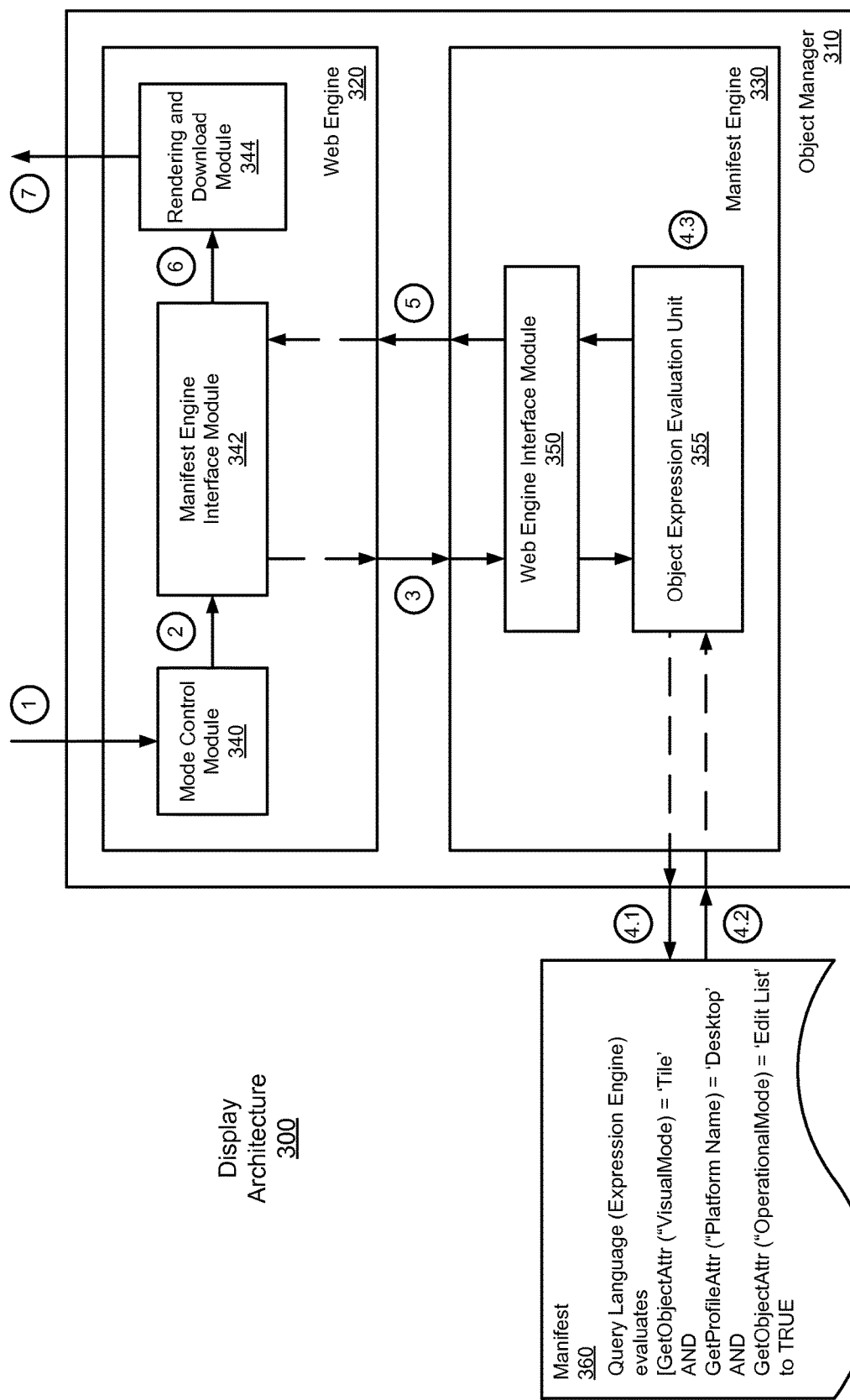
FIG. 3 is a simplified block diagram illustrating an example of the simplified display architecture of FIG. 2 in greater detail, according to embodiments of the methods and systems disclosed herein.

FIG. 3 is a simplified block diagram illustrating an example of the simplified display architecture of FIG. 2 in greater detail, according to embodiments of the methods and systems disclosed herein. As noted, FIG. 3 illustrates the components and operation of a display architecture 300, which is comparable to display architecture 200, although depicted in greater detail. In the scenario illustrated in FIG. 3, display architecture 300 includes an object manager 310. As before, object manager 310 includes a web engine (depicted in FIG. 3 as a web engine 320) and a manifest engine (depicted in FIG. 3 as a manifest engine 330). As can be seen, FIG. 3 depicts these elements in greater detail. In that regard, web engine 320 can be seen to include a mode control module 340, a manifest engine interface module 342, and a rendering and download module 344. Also depicted in greater detail, manifest engine 330 can be seen to include a web engine interface module 350 and an object expression evaluation unit 355. In the manner described previously, web engine 320 communicates with a display client (not shown) and manifest engine 330, in order to provide information related to user interface elements to the display client. Manifest engine 330, also in similar fashion, accesses a manifest 360 (a construct which can, for example, be included as part of a manifest file (not shown), in order to provide appropriate user interface element information to web engine 320 (and thus, the display client).

In operation, an object manager (e.g., object manager 310) of a display architecture (e.g., display architecture 300) is able to present one or more JS files in response to receiving a request from a display client (not shown). Such operations begin with the receipt of a request from the display client (e.g., with Visualization='Tiles'), as indicated at "1" in FIG. 3. Next, the web engine of object manager 310 (e.g., web engine 320, by way of a mode control module 340, for example) sets VisualMode='Tile' and PlatformName='Desktop' (OperationalMode='Edit List' by default), as indicated at "2" in FIG. 3. As indicated at "3" in FIG. 3, web engine 320 then requests (e.g., by way of manifest engine interface module 342) the following, from manifest engine 330:

JS files, such as, optionally, a physical renderer and other JS files, and
One or more web templates.

As a result, manifest engine 330 receives the request from web engine 320 at web engine interface module 350, and, in turn, requests manifest information in the form of a manifest, as indicated at "4.1" in FIG. 3. In response, manifest engine 330 receives the manifest information (depicted in FIG. 3 as manifest 360), as indicated at "4.2" in FIG. 3. In the example illustrated in FIG. 3, the manifest information thus retrieved reflects the following information:

---

Query Language (Expression Engine) evaluates
    [GetObjectAttr("VisualMode) = 'Tile'
  AND
    GetProfileAttr("Platform Name) = 'Desktop'
  AND
    GetObjectAttr("OperationalMode) = 'Edit List'
to TRUE

---

As will be appreciated in light of the present disclosure, a manifest such as manifest 360 is a set of instructions that a user interface architecture uses to identify script files (e.g., JS files) to download from the server to the client, such that the client can render the desired and appropriate screens, views, and applets.

Having received this manifest information, manifest engine 330 (and more specifically, object expression evaluation unit 355) evaluates the manifest information received, as indicated at "4.3" in FIG. 3, performing such evaluation for each expression populated in "UI Object Expressions" for the given applet, until the first true expression is encountered, for example. Typically, manifest engine 330 (object expression evaluation unit 355) performs such evaluations once for UsageType='Physical Renderer' and once for UsageType='Web Template', which is described in connection with FIG. 4 as performing expression evaluation on the object expressions in manifest file(s). It should be noted at this juncture that the use of object expressions is a flexible and powerful tool provided by embodiments of the methods and systems disclosed herein, and is discussed in greater detail subsequently.

Manifest engine 330 then returns the results to web engine 320, by way of web engine interface module 350 and manifest engine interface module 342, as indicated at "5" in FIG. 3.

As noted, such a response will include:
JS files, such as, optionally, a physical renderer and other JS files, and
One or more web templates Web engine 320 uses the one or more web templates for rendering (e.g., HTML rendering) and downloads the requisite JS file(s). Next, manifest engine interface module 342 passes this information to rendering and download module 344, as indicated at "6" in FIG. 3. Rendering and download module 344 then downloads the JS files (e.g., a physical renderer (optionally) and other JS files) to the display client, as indicated at "7" in FIG. 3.

Figure 4:
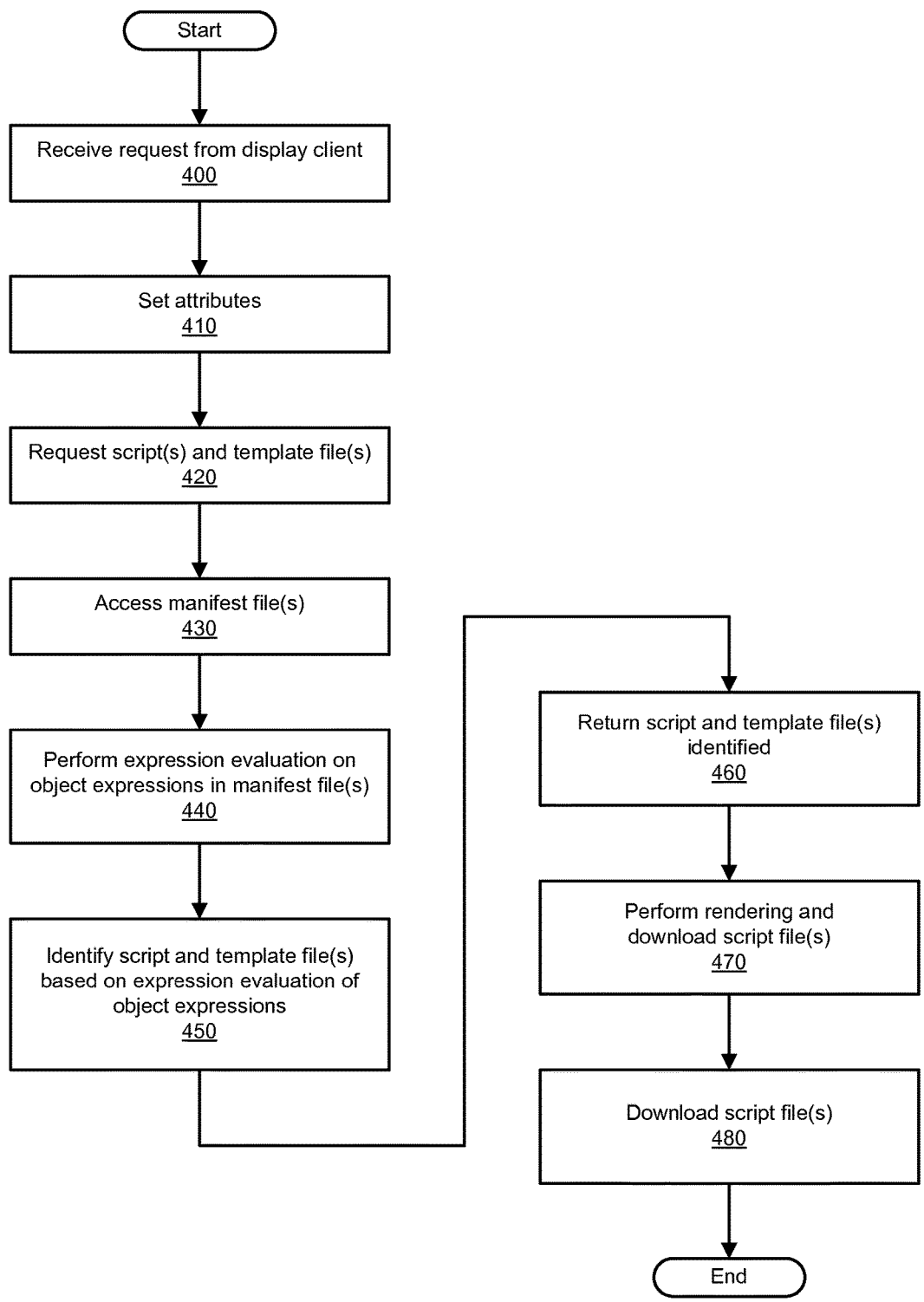
FIG. 4 is a simplified flow diagram illustrating an example of a process of obtaining one or more script file(s), according to embodiments of the methods and systems disclosed herein.

FIG. 4 is a simplified flow diagram illustrating an example of a process of obtaining one or more script file(s), according to embodiments of the methods and systems disclosed herein. That being the case, the process depicted in FIG. 4 describes, generally, operations that can be effected within display architectures such as display architecture 200 and display architecture 300. Such a process can begin with the receipt of a request from a display client by a web engine such as web engine 230 (step 400). Next, processing/screen attributes are set (step 410). At this juncture, the web engine requests the requisite script(s) and template file(s) from the manifest engine (e.g., manifest engine 240) (step 420). In response to such a request, the manifest engine accesses one or more manifest files in order to obtain the requisite manifest (e.g., manifest 260), and so, the object expressions that will be used to determine the scripts and other information to ultimately be provided to the display client. Having retrieved the requisite manifest data, the manifest engine performs object expression evaluation on the object expressions in the manifests thus obtained (step 440). Next, based on the evaluation of the object expressions, the manifest engine identifies the appropriate script(s) and template(s) to return to the web engine (step 450). Having made such identification, the manifest engine returns the script(s) and template(s) thus identified to the web engine (step 460). The web engine, having received the requisite script(s) and template(s), then proceeds to perform rendering and download of the script and template files (step 470). Having obtained these files, the web engine then downloads that information to the requesting display client for its use in presenting the desired user interface elements appropriately (step 480).

As noted, a manifest is a set of instructions that a user interface architecture uses to identify script files to download from the server to the client, such that the client can render the desired and appropriate screens, views, and applets. Such a manifest provides flexible rendering of each piece of a user interface, and can do so depending on conditions that can very dynamically at runtime. These conditions are expressed as object expressions that evaluate to true or false at any given point of time. These expressions can, for example, follow query language syntax. A query language expression that evaluates to a boolean value, and makes sense in the scope of current state of the application, can be used as a filter to govern which deployed artifact(s) is used for rendering a given area of the user interface in question.

Artifacts that commonly work together to render an area of a user interface typically include:
JS files
CSS files
Templates (e.g. web templates that can be configured for a given element of a user interface and are used by a server when rendering)
Server HTML rendering modules A manifest according to embodiments of the methods and systems disclosed herein facilitates configuration of the above types of artifacts, which are to be used when certain dynamic conditions are satisfied in the scope of any logically independent area of a user interface. Approaches using the manifest techniques can be used with applications, views and applets, as well as other areas of a user interface and other artifacts, and can, for example, be used to configure usage of JS, CSS and Web Templates.

Manifest Configuration Views

The following is a description of manifest configuration operations according to one embodiments of the methods and systems disclosed herein. In such an embodiment, three manifest administration views are provided:
1) Manifest Administration View—This view contains the following applets
   UI Objects—This is the parent applet of the main manifest administration view is used to configure a user interface object against which files are being configured. The fields are as follows
      Inactive Flag—Each applet in the three manifest administration related views has this field, to facilitate activation/inactivation of records at each level. An inactive record is not considered by the manifest system during processing.
      Type—Signifies the type of user interface object that files are being configured for. Possible values include:
         Application
         View
         Applet
         Navigation
         Toolbar
         Menu
         Control
      Usage Type—Signifies what the files being configured are used for with respect to the given user interface object. Possibilities include:
         Common—This indicates the file is downloaded at application initialization. The files against this a record with this usage type are usually bootstrap JS files.
         Theme—This indicates the file is used for a specific application skin Presentation Model—This is one of the two types of JS files required for any particularly part of a user interface (corresponding to one of the categories allowed for in the "Type" field mentioned above.

Physical Renderer—This is one of the two types of JS files used in rendering elements part of a user interface (corresponding to one of the categories allowed for in the "Type" field mentioned above).

Web Template—This indicates that the "Web Template Name" configured on the "winning" user interface object expression record under this user interface object record corresponds to the web template record configured in tools that should be used for rendering this user interface object.

Server Renderer—This component is used to configure the renderer that should be used on the server side to render HTML from the server pertaining to this element of a user interface.

Name—Name of a user interface object as configured in the corresponding tools record which contains all the metadata pertaining to this element of the user interface (e.g., when the "Type" is applet, the name is the name of applet as configured in tools).

Object Expression—This applet is used to configure the expressions which should be evaluated to decide which record should be selected for choosing the relevant specific artifact (of one of the categories mentioned in the list of usage types described above). Expressions can be simple, where just a single query language API is executed, or complex, with multiple APIs being combined via logical AND/OR operators and even nested with multiple levels in some cases. The object expressions applet is a hierarchical list applet, and complex expressions can be entered by as multiple records, entered in a hierarchy, and rooted at the topmost record that represents the entire grouping of records that constitute the complex expression. At any given level, expressions can be logically combined using the "Operator" specified on the immediate parent record. For a record that represents a simple expression, the "Expression" should be populated. For a record that represents a logical grouping of expressions, the "Group Name" and "Operator" should be populated.

The fields in the applet are as follows:

Inactive Flag—Each applet in the three manifest administration views has this field, to facilitate activation/inactivation of records at each level. An inactive record is not considered by the manifest system during processing.

Group Name—If this record represents the grouping on two or more expressions, using a particular logical operator (AND/OR), it can be given a "Group Name" (e.g., the "Group Name"='Grid' can be the case for a record that groups 3 expressions into a compound one—"Desktop AND EditList AND Grid", as discussed in connection with the example provided in FIG. 3).

Expression—If this record represents a simple expression that is on its own as a top level expression or part of a compound expression, then "Expression" field needs to be set.

In the example depicted in FIG. 3, three such expression records appear under the "Group Name"='Grid', which the following "Expression" field values:
Desktop
EditList
Grid Level—The level determines the order in which expressions are evaluated. Expressions at any level of the hierarchy (top level expressions or child expressions in the case of a compound expression) are evaluated in the order of ascending "levels" within any given level of the hierarchy. In the example depicted in FIG. 3, the compound expression with "Group Name"='Grid' is evaluated before the compound expression with "Group Name"='Tile', which in turn is evaluated before the compound expression (not shown expanded) with "Group Name"='Map'. Artifacts against the first expression that evaluates to true are picked up for download to the client, and the remaining expressions are no longer considered.

Operator—For a compound expression, the parent must specify which logical Operator to use to combine the children during evaluation. This is stored in the "Operator" field. Permissible values are based on logical relationships, and can be, for example:
AND
OR Web Template Name—If the "Usage Type" of the parent user interface object record is 'Web Template', then the the web template file corresponding to the "Web Template Name" configured in a user interface object extension record that evaluates to true is found from the list of web template records configured for a user interface object in tools. For other "Usage Types", the file(s) for the corresponding web artifacts are populated in the "Files" applet.

The example depicted in FIG. 3 shows the "Contact List Applet" configured as a user interface object of "Type"='Applet' and "Usage Type"='Physical Renderer'. When this applet is loaded, every top expression (simple or group) in the corresponding user interface object expressions applet is evaluated until an expression evaluates to TRUE. The files corresponding to the first expression that evaluates to true will be considered for download of the corresponding JS file.

The first two top level records in a user interface object expressions applet, shown in FIG. 3, can be considered. The manifest system can interpret them (with their child expression records) as follows:
i) Desktop (Platform) AND EditList (Mode) AND Grid (Visualization)
ii) Desktop (Platform) AND EditList (Mode) AND Tile (Visualization)

As will be appreciated, for a list applet, if the Application is running on a desktop browser and the user has chosen a visualization of grid, the first expression will evaluate to true. Alternatively, for a list applet if the application is running on a desktop browser and the user has chosen a visualization of tile, the first expression will evaluate to false and the second expression will evaluate to true.

Files—This applet is used to configure the actual file(s) that should if the corresponding (simple or complex) user interface object expressions record evaluates to true, and is a child applet of the object expressions applet.

Given the two expressions mentioned above, the corresponding files are as shown below 1. Desktop (Platform) AND EditList (Mode) AND Grid (Visualization)—/jqgridrenderer.js
2. Desktop (Platform) AND EditList (Mode) AND Tile (Visualization)—/Tilescrollcontainer.js The fields in this applet are
Inactive Flag—Each applet in the three manifest administration related views presents this field, to facilitate activation/inactivation of records at each level. An inactive record is not considered by the manifest system during processing.
Name—The file name.

2) Manifest Expressions View—This view has a single applet "Expressions." This is where the object expressions are configured. The expressions seen in the expressions field of the object expressions applet in the manifest administration view are actually shorthand names, that have been assigned to real expressions using this applet (e.g., the expressions "Grid" and "EditList" seen in FIG. 3 are actually configured as [GetProfileAttr("VisualMode")='Grid'] and [GetProfileAttr("OperationalModel")='Edit List'], respectively).

3) Manifest Files View—This is the third of the manifest administration views, with only one applet—"Files". Files that are to be configured against the any user interface object for any object expression should be first registered in this view.

When processing object expressions records for choosing the files for a given user interface object, the first expression that evaluates to TRUE is selected and the file against it is downloaded to the browser. However, an exception to this rule is that, for user interface object records with Type='Application' and Usage Type='Common', instead of only the first expression being considered, all expressions in the object expression list are considered, and files against all expressions that evaluate to TRUE are aggregated and downloaded to the browser. A summary of file selection rules appears below as Table 1.

TABLE 1

Summary of file selection rules.

| UI Objects Record Values | Oracle record present | Customer Record present | File Selection Rule |
|---|---|---|---|
| Type = 'Application' and Usage Type = 'Common' | Yes | No | All files against all winning expressions under the Oracle supplied UI Objects record are aggregated and downloaded to the browser |
| Type = 'Application' and Usage Type = 'Common' | Yes | Yes | All files against all winning expressions under both the Oracle supplied and Customer entered UI Objects record are aggregated and downloaded to the browser |
| Usage Type != 'Common' | Yes | No | The file against the first winning expressions under the Oracle supplied UI Objects record is downloaded to the browser |
| Usage Type != 'Common' | Yes | Yes | The file against the first winning expressions under the Customer entered UI Objects record is downloaded to the browser |

Example of Manifest Configuration: Multiple Visualization Configuration for an Applet This example demonstrates how a list applet can be configured using the manifest, to have either grid style visualization or a tiles visualization. As will be appreciated in light of the present disclosure, the following terms should be considered:

Applet Visualization—Visual manifestation of the applet (e.g., tiles, map, grid, carousel, and the like).

Applet Modes—Different states of an Applet depending on which the Use Cases allowed by the Applet are decided e.g. in Query Mode an Applet can be queried for records whereas in Edit Mode for a form Applet and EditList mode for a List Applet records can be created, updated, or deleted. Examples of Applet modes are Edit, New, Query, Edit List, Base As explained earlier, information in the manifest indicates selection of the appropriate artifacts for a particular element of the user interface, based on any number of dynamic conditions, that are specified as expressions which evaluate to TRUE if the conditions are satisfied. In this example, an area of a user interface that shows an applet will use artifacts that render a grid or artifacts that render tiles, based on two dynamic conditions, the applet visualization asked for and the applet mode. The applet mode is already defaulted to EditList via existing tools configuration, whereas the applet visualization is set based on the request that comes in depending on the user action of pressing the grid or tiles buttons in the management interface.

The first step in such a process is to configure the Applet Web Template (AWT) in the applet for different visualization. An AWT file is a template file that governs part of the mark-up language (e.g., HTML) that is rendered by the server for a given applet. At this juncture, a new AWT is created for each applet visualization desired. This operation is performed such that, once the AWT to be used is determined (based on the applet visualization, applet mode and other conditions), the web engine will, in certain situations, render the web template only if the web template has been configured.

Next, the manifest administrator view is used to configure the AWT(s) that were configured for the respective applet visualizations. It will be appreciated that, in light of the present disclosure, no extra manifest configuration is required for grid visualization, if that is the default applet visualization. The manifest administrator view can then be used to configure the physical renderer for the each applet visualization. The physical renderer is a JS file that, in certain embodiments, serves a particular purpose in the overall user interface technology stack. Finally, the manifest expressions view is used to configure the expression shorthand strings as aliases to the actual query language expressions.

In summary, two categories of UI artifacts were configured in the foregoing example, a physical renderer (essentially a particular type of JS file) and a web template, to be used when the following conditions are satisfied:
1) The connecting client browser is a desktop browser (as opposed to a mobile browser)
2) The applet mode is EditList (which is typically the default mode for most list applets)
3) The chosen visualization is tiles.

When using grid visualization, no configuration is typically required, as grid visualization is typically implemented in the framework. Table 2 reflects the effects of applet visualization. As will be appreciated, the operations discussed above can be better understood in the context of FIGS. 3 and 4, as noted. Further, please refer to Appendix A, which is attached hereto and is incorporated herein by reference, in its entirety and for all purposes.

TABLE 2

Effects of applet visualization.

| Applet Visualization | Physical Renderer | Web Template |
|---|---|---|
| Tile | /Tilescrollcontainer.js | Edit Tile |
| Grid | Default list physical Tenderer will be picked (jqgridrenderer.js), nothing needs to be configured in manifest administration | Nothing needs to be configured. Web Template of type "Edit List" configured in tools for given list applet will be picked. |

Figure 5:
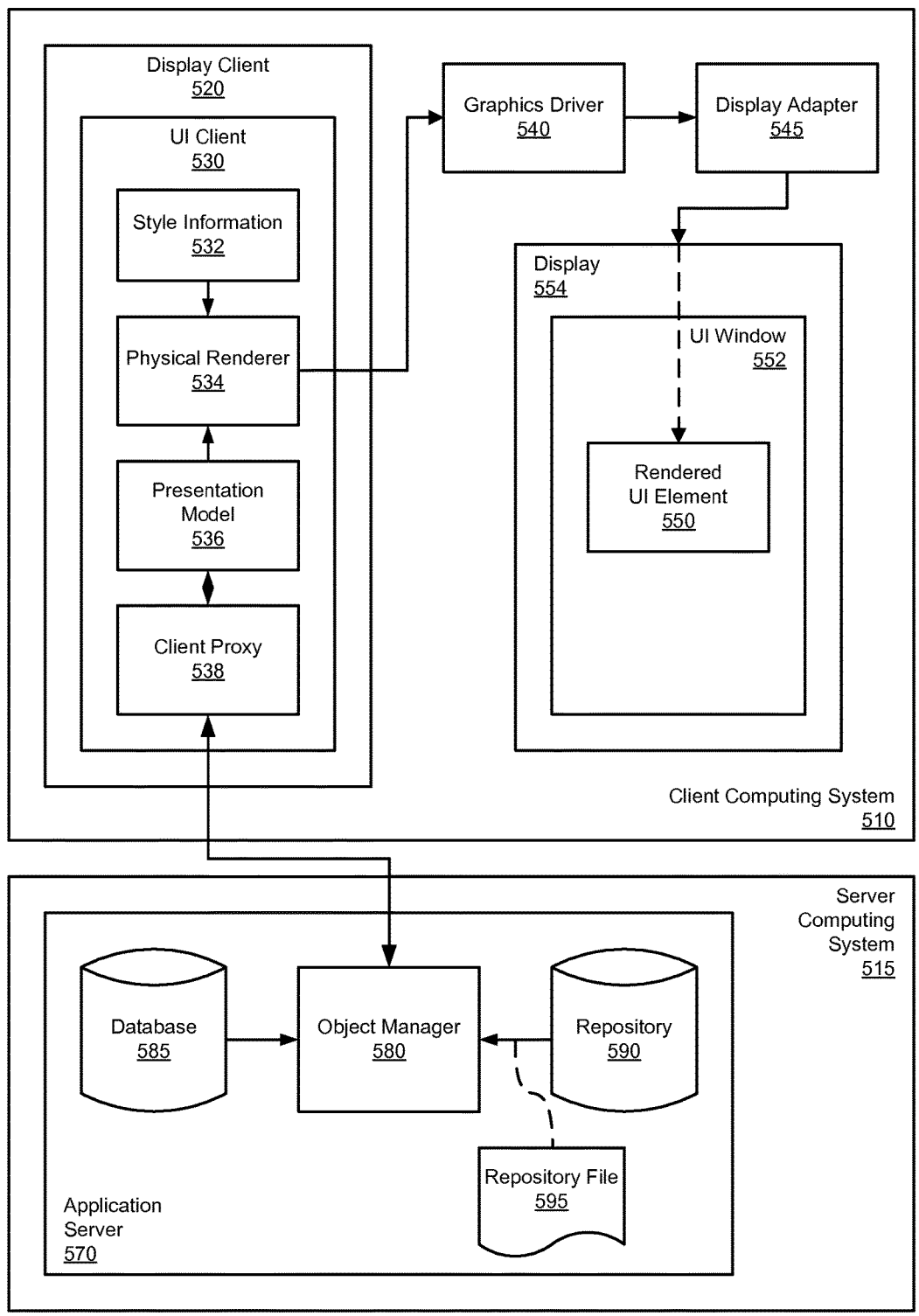
FIG. 5 is a simplified block diagram illustrating an example of a user interface architecture, in which a user interface element is rendered using a manifest, according to embodiments of the methods and systems disclosed herein.

FIG. 5 is a simplified block diagram illustrating an example of a user interface architecture, in which a user interface element is rendered using a manifest, according to embodiments of the methods and systems disclosed herein. More specifically, FIG. 5 depicts a user interface architecture 500 that includes a client computing system 510 and a server computing system 515. Client computing system 510 includes a memory and/or other computer-readable storage media, which supports execution of a display client 520. Display client 520 includes a user interface (UI) client 530, which, in turn, includes style information 532, a physical renderer 534, a presentation model 536, and a client proxy 538. As will be appreciated in light of the present disclosure, style information 532 and physical renderer 534 are depicted in FIG. 5 as having already been downloaded to client computing system 510 (and more specifically, display client 520). As noted earlier with reference to FIGS. 1B and 3, in the scenario depicted in FIG. 5, style information 532 and physical renderer 534 are installed separately from other components of the user interface configuration operations managed using the manifest information employed. Presentation model 536 and client proxy 538 operate to obtain the requisite scripts, templates and mark-up language information in order to render the desired user interface element. To this end, physical renderer 534, via a graphics driver 540 and a display adapter 545, renders a user interface element (depicted in FIG. 5 as a rendered UI element 550) in a UI window 552, which is displayed by a display 554. To achieve this end, client proxy 538 interacts with components of server computing system 515. In particular, client proxy 538 interacts with an application server 570 running on server computing system 515. More specifically, client proxy 538 interacts with an object manager 580, which is a component of application server 570. In satisfying data requests from client proxy 538, object manager 580 accesses a database 585, in order to provide runtime data to client proxy 538 and, ultimately, rendering by physical renderer 534 via presentation model 536. Object manager 580 also accesses a repository 590, which responds with metadata in the form of, for example, repository file 595. This metadata, associated with the data retrieved from database 585, describes the organization, definition, and other characteristics of that data.

Figure 6:
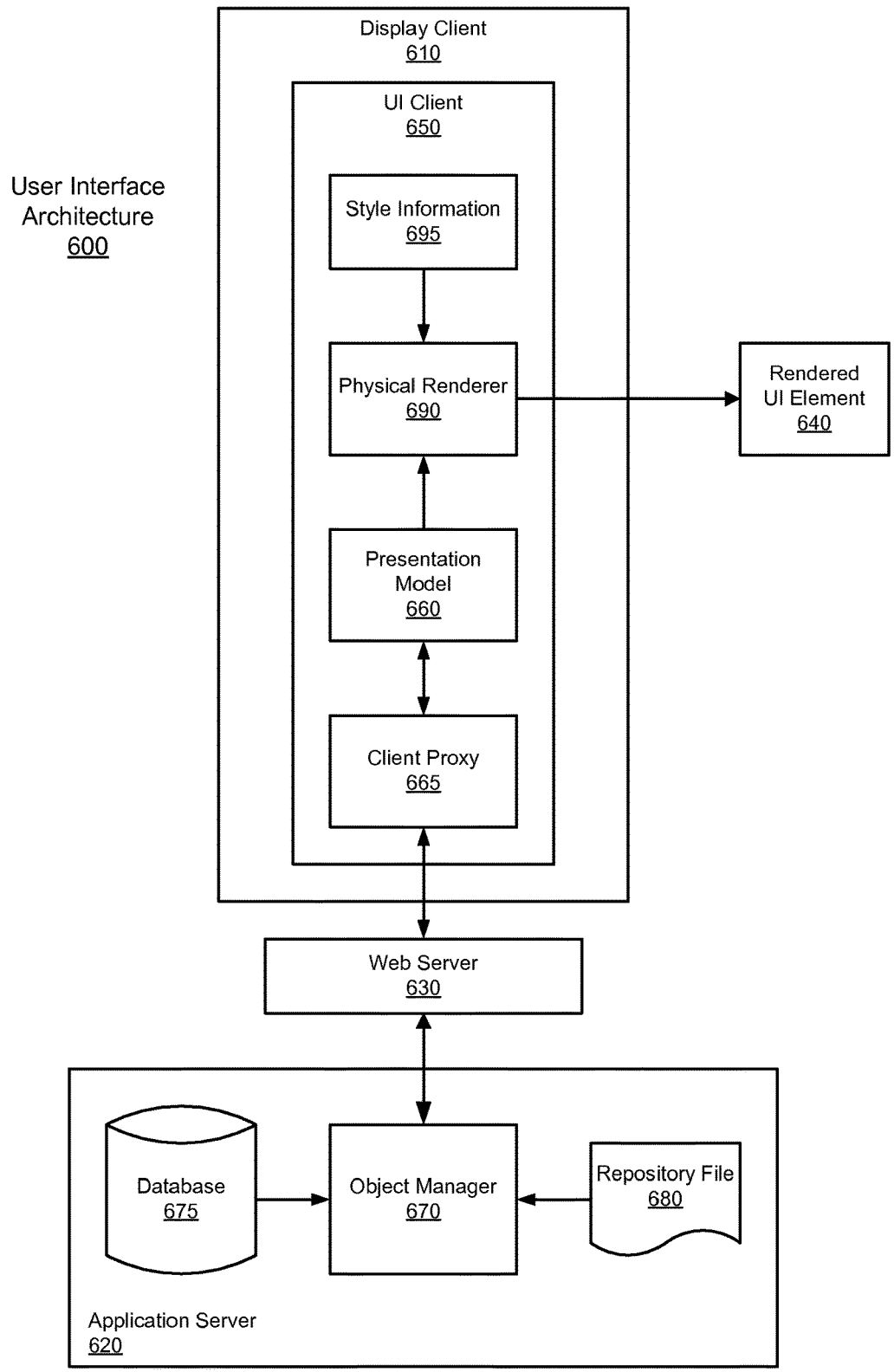
FIG. 6 is a simplified block diagram illustrating an alternate example of a user interface architecture, in which a user interface element is rendered using a manifest, according to embodiments of the methods and systems disclosed herein.

FIG. 6 is a simplified block diagram illustrating an alternate example of a user interface architecture, in which a user interface element is rendered using a manifest, according to embodiments of the methods and systems disclosed herein. FIG. 6 depicts a user interface architecture 600 designed in a manner comparable to that of user interface architecture 500, and reflects certain components of a web interface and their arrangement therein. Thus, user interface architecture 600 depicts a display client 610 and an application server 620 coupled to one another via a web server 630. In user interface architecture 600, display client 610, by accessing application server 620 via web server 630, renders a user interface element (depicted in FIG. 6 as a rendered UI element 640) in a window displayed on a display (not shown). More specifically, a UI client 650 communicates with components of application server 620 via web server 630 by way of a presentation model 660 sending a request to a client proxy 665, which, in turn, sends a request to an object manager 670 of application server 620 via web server 630. In response, object manager 670 retrieves data from a database 675 and metadata (as a repository file 680), and provides the retrieved data/metadata to client proxy 665 via web server 630. In turn, client proxy 665 provides this dataset to presentation models 660, which, in turn, provides the dataset to a physical renderer 690. Physical renderer 690, using style information 695, renders the dataset and other user interface element as a rendered UI element 640 in a window displayed in a display (not shown).

Figure 7:
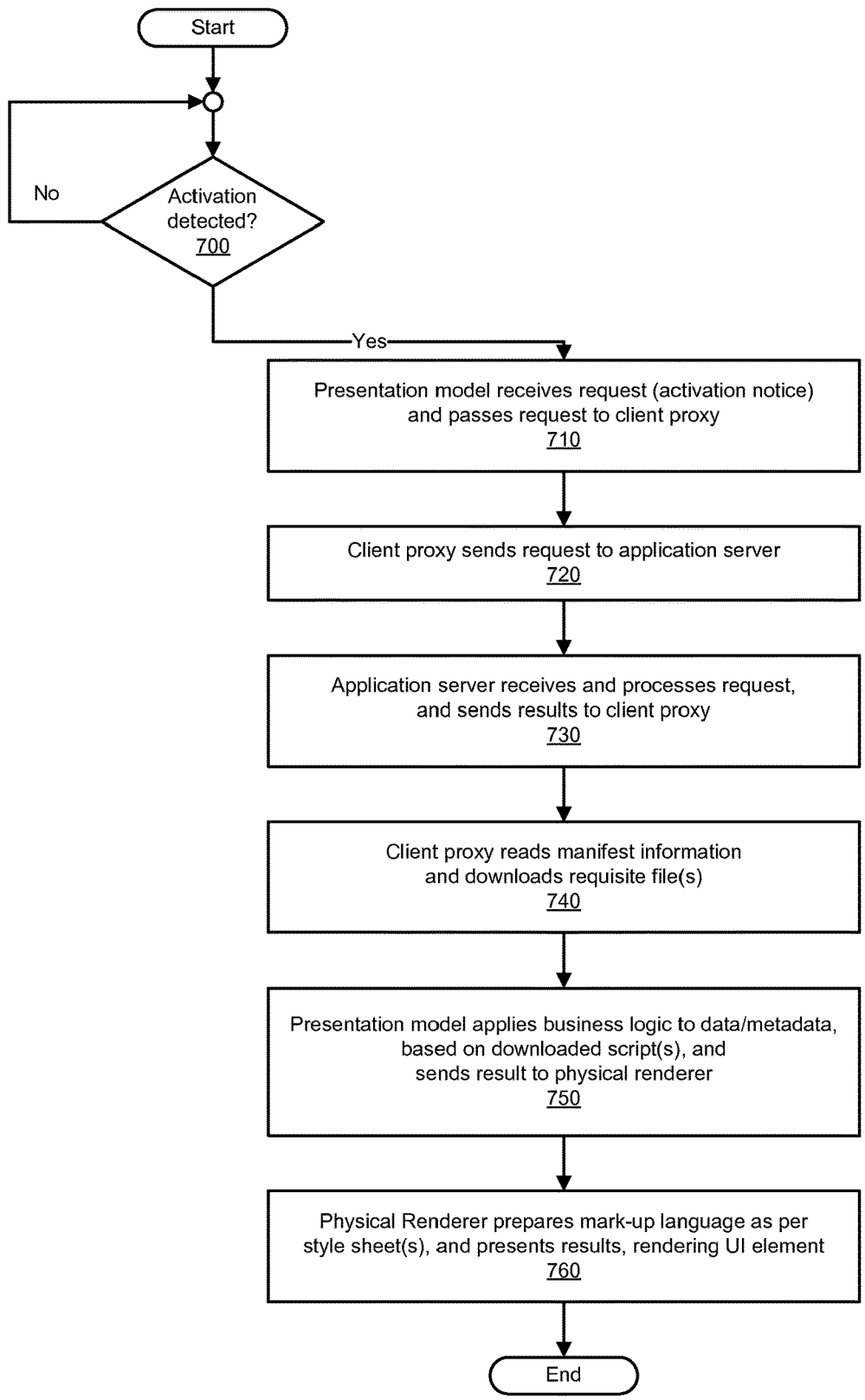
FIG. 7 is a simplified flow diagram illustrating an example of a process of presenting a user interface element using a manifest, according to embodiments of the methods and systems disclosed herein.

FIG. 7 is a simplified flow diagram illustrating an example of a process of presenting a user interface element using a manifest, according to embodiments of the methods and systems disclosed herein. The process of FIG. 7 describes, generally, the operations that can occur in the rendering of a user interface element in user interface architectures such as user interface architecture 500 and/or user interface architecture 600. This process of rendering a user interface element begins with the detection of a link activation (step 700). As illustrated, the system can await the activation of a link, which comprehends a determination that the link thus activated should be processed according to the operations depicted in FIG. 7. Upon the detection of a link activation, a request (activation notice) or link activation) is received by the presentation model, and passed to the client proxy (step 710). Upon receipt of such request, the client proxy sends a comparable request to the application server, and more specifically, to the object manager thereof (step 720). At this juncture, the application server receives and processes the request, accessing the appropriate database(s) and repository/repositories, thus processing the request. Having gathered the requisite data/metadata, the application server sends these results, as, for example, a dataset, to the client proxy (step 730). Having received the data/metadata, the client proxy reads manifest information and downloads the requisite file(s) indicated thereby (step 740). The client proxy notifies the presentation model of the availability of the data/metadata, script file(s) and template(s), at which point, the presentation model applies business logic to the data/metadata, based on the downloaded script(s). Presentation model then sends the results of these operations to the physical renderer (step 750). In turn, the physical renderer prepares mark-up language information as per the relevant style sheet (s), and presents the results, rendering the desired user interface element (step 760). These operations are depicted and described with reference to various components of a user interface architecture in connection with FIGS. 8-16.

Figure 8:
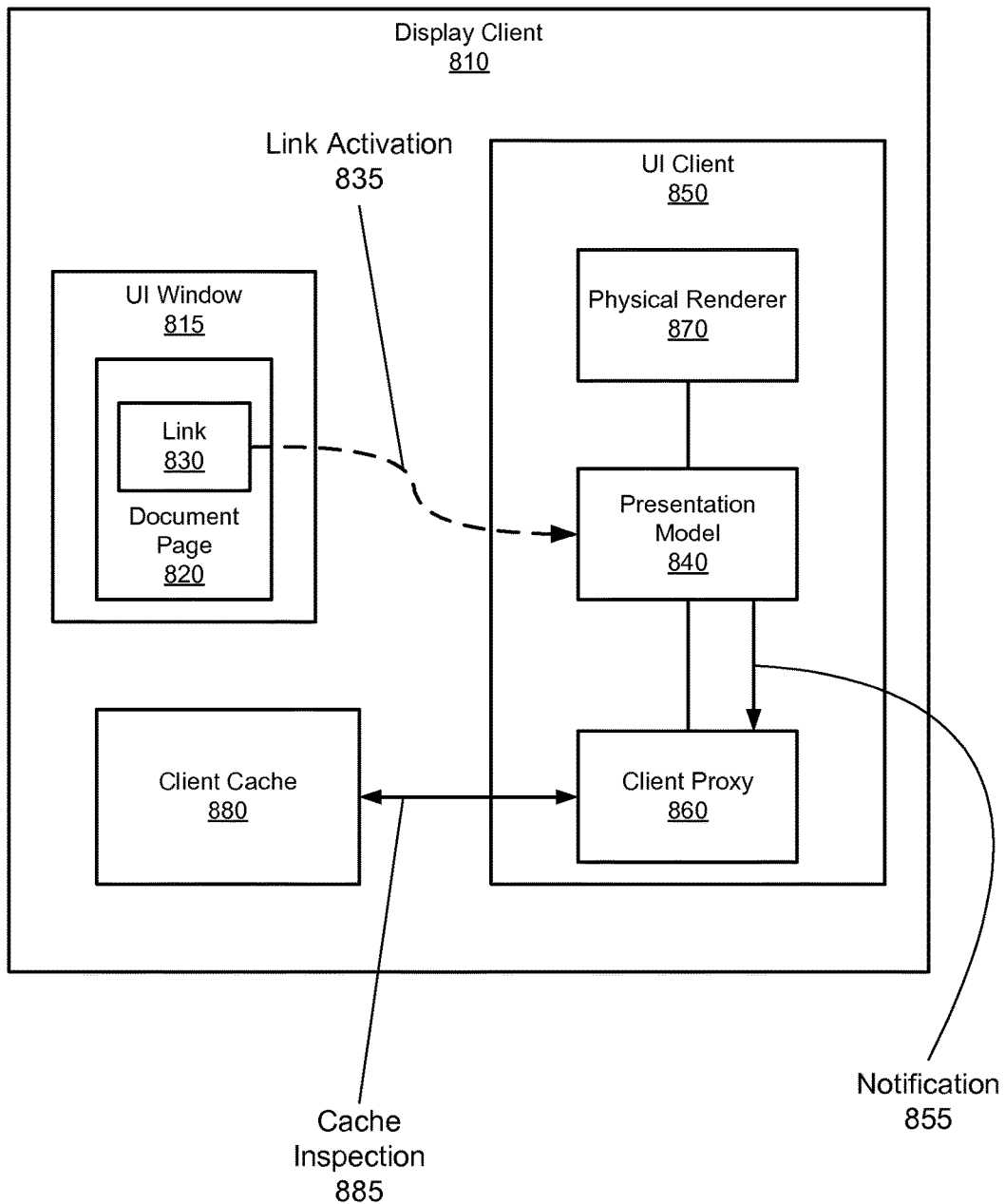
FIG. 8 is a simplified block diagram illustrating an example of link activation in a user interface architecture employing a manifest, according to embodiments of the methods and systems disclosed herein.

FIG. 8 is a simplified block diagram illustrating an example of link activation in a user interface architecture employing a manifest, according to embodiments of the methods and systems disclosed herein. As noted above, FIGS. 8-16 depict various points in a process of rendering a user interface in a user interface architecture 800. In FIG. 8 a display client 810 presents (e.g., a user with) a UI window 815, within which a document page 820 is displayed. Within document page 820, display client 810 displays a link 830. Link 830 can be, for example, a universal resource location (URL) or other such construct. In the scenario depicted in FIG. 8, a user activates link 830 (indicated in FIG. 8 by a link activation 835). The activation of link 830 is captured by a presentation model 840 of a user interface client 850 by the receipt of link activation 835 by presentation model 840. At this juncture, presentation model 840 sends a notification 855 to a client proxy 860 of user interface client 850. While not involved in these operations, user interface 850 is shown as also including a physical renderer 870, for completeness, as such a physical renderer can be pre-installed/pre-configured on display client 810, as part of user interface client 850 (although, as noted elsewhere, a physical renderer can be downloaded (e.g., from a web/application server)).

In response to the receipt of notification 855, client proxy 860 inspects a client cache 880 (the operation being indicated in FIG. 8 as a cache inspection 885). In so doing, client proxy 860 makes a determination as to whether requisite information (e.g., data and/or metadata related to link activation 835) is stored in client cache 880. In the case in which the desired data/metadata is stored in cache 880, a process of rendering this data proceeds to accessing manifest information, as per the operations depicted in FIG. 12 and its associated discussion, below. Alternatively, if client proxy 860 determines that the desired data/metadata has not been cached in client cache 880, client proxy 860 proceeds to make a data request to retrieve the desired data/metadata. Such an operation is described in greater detail in connection with FIG. 9, below.

Figure 9:
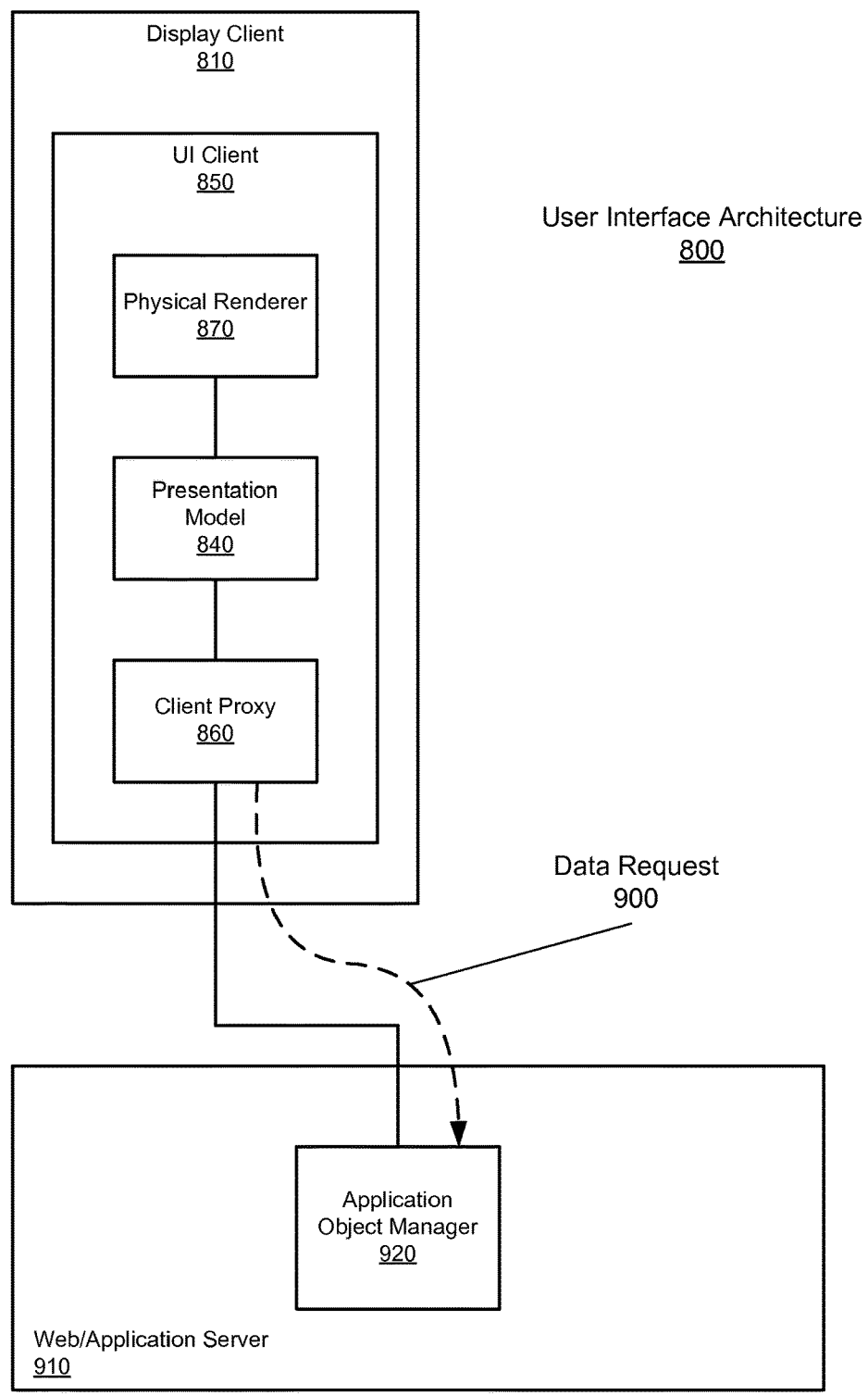
FIG. 9 is a simplified block diagram illustrating an example of a data request in a user interface architecture employing a manifest, according to embodiments of the methods and systems disclosed herein.

FIG. 9 is a simplified block diagram illustrating an example of a data request in a user interface architecture employing a manifest, according to embodiments of the methods and systems disclosed herein. At this juncture, client proxy 860, as depicted in FIG. 9, sends a data request 900 to a web/application server 910, and more specifically to an application object manager 920 thereof. Data request 900 requests that application object manager 920 retrieve the requisite data/metadata, and provide the data/metadata retrieved to client proxy 860. As will be appreciated, elements depicted in the figures having the same reference numbers and used in other figures are intended to convey elements providing the same or comparably similar functions and operations. Application object manager 920 can provide such results to client proxy 860 in the form of, for example, a dataset.

Figure 10:
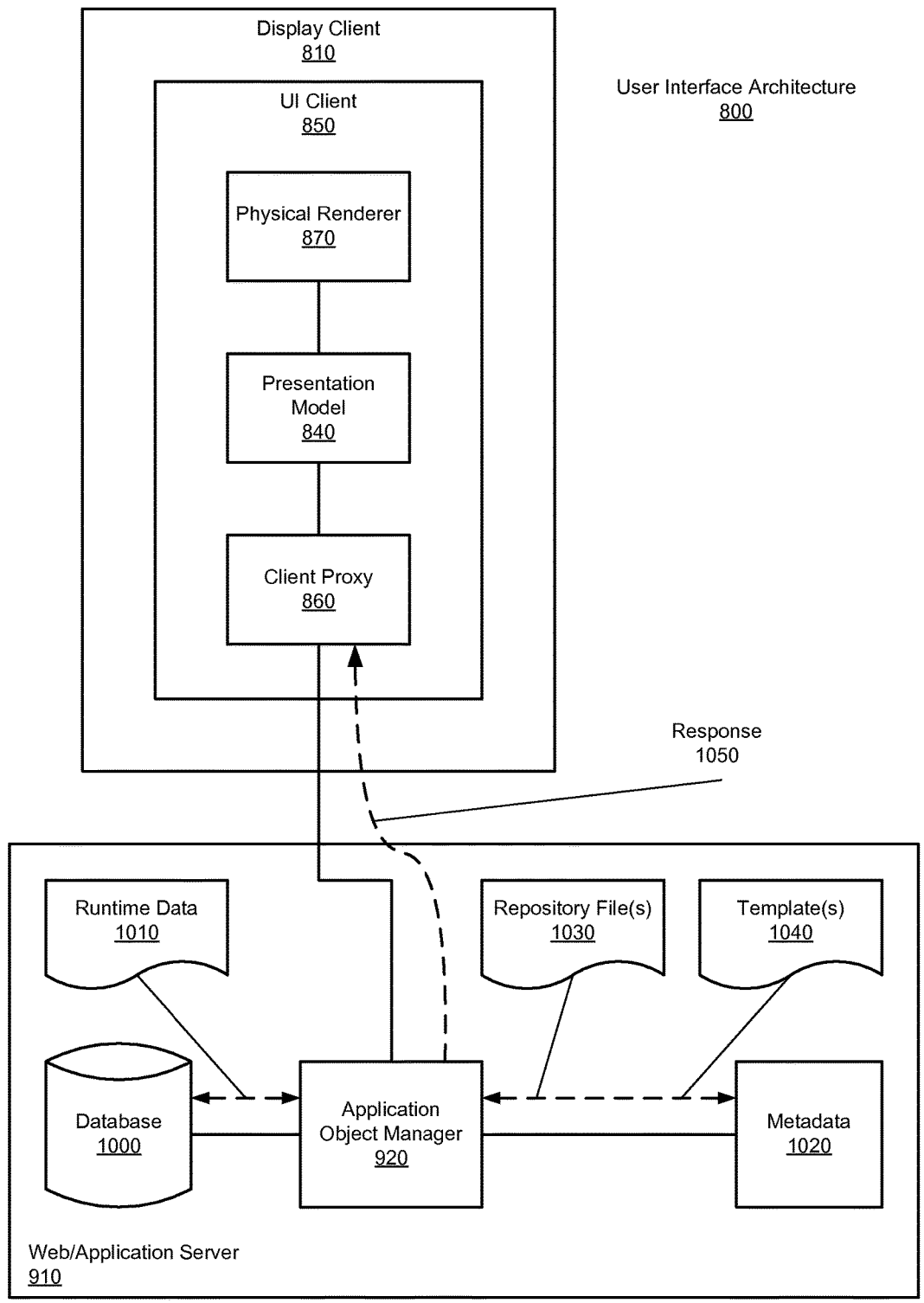
FIG. 10 is a simplified block diagram illustrating an example of data access and response operations in a user interface architecture employing a manifest, according to embodiments of the methods and systems disclosed herein.

FIG. 10 is a simplified block diagram illustrating an example of data access and response operations in a user interface architecture employing a manifest, according to embodiments of the methods and systems disclosed herein. In such a scenario, the object manager accesses runtime data and associated metadata, and notifies client proxy of availability (or actually sends requested data sets). In order to satisfy data request 900, application object manager 920 accesses a database 1000 and retrieves runtime data 1010 therefrom. Additionally, application object manager 920 accesses metadata 1020, retrieving one or more repository files (depicted in FIG. 10 as repository files 1030) and one or more templates (depicted in FIG. 10 as template(s) 1040). As noted elsewhere herein, repository file(s) 1030 include(s) information regarding the organization and other characteristics of runtime data 1010. Template(s) 1040 provide(s) information regarding layout, functionality, and other characteristics used in rendering user interface elements that may be used to display (present) runtime data 1010. Having gathered the requisite data/metadata, application object manager 920 returns this information to client proxy 860 in a response 1050 (e.g., as a dataset). As noted elsewhere herein, metadata 1020, for example, can include information such as object definitions for columns, applets, views, screens, and other such user interface elements. Runtime data 1010, retrieved from database 1000, can be, for example, actual user data that is to be displayed (presented) in the user interface element.

Figure 11:
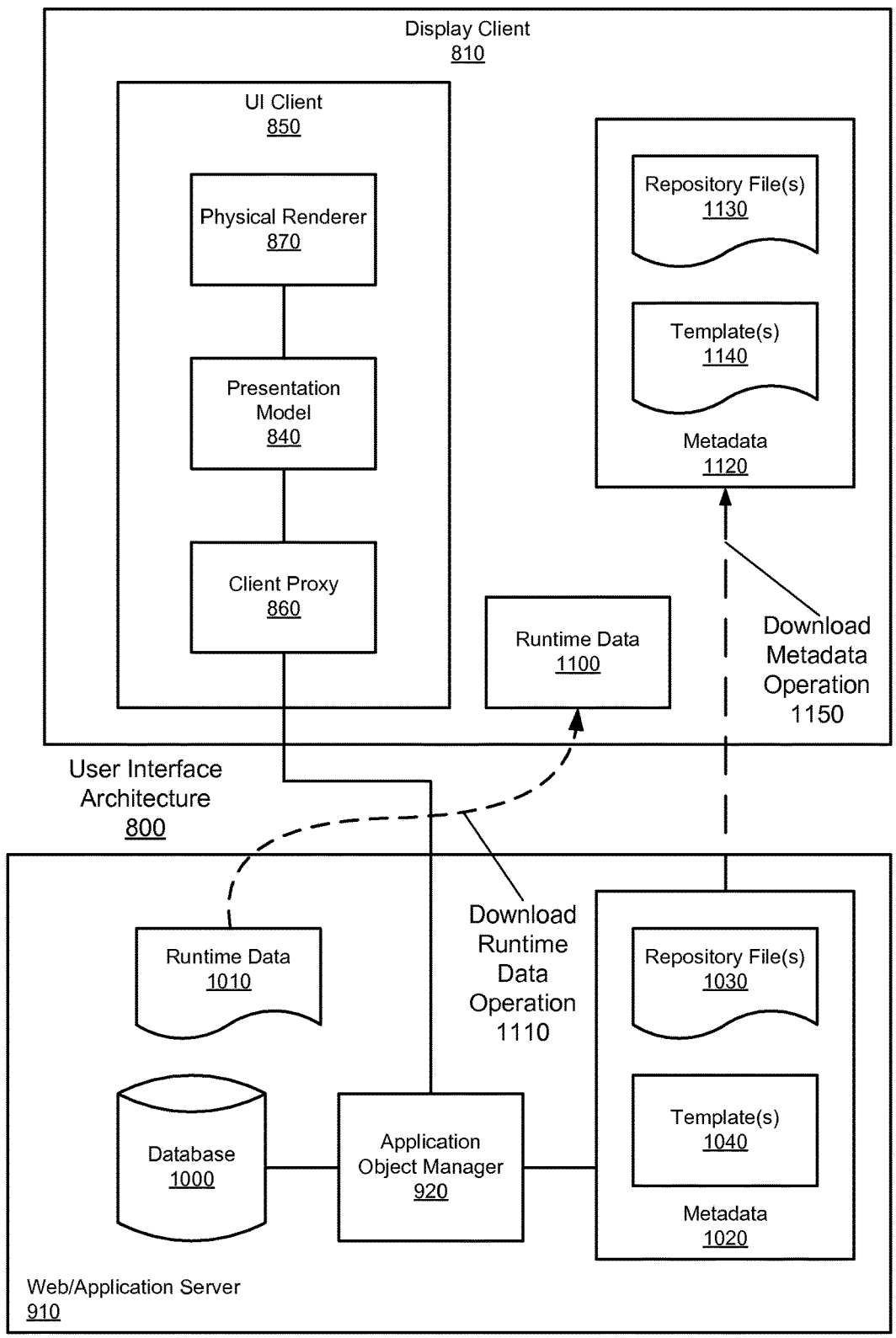
FIG. 11 is a simplified block diagram illustrating an example of data and metadata download in a user interface architecture employing a manifest, according to embodiments of the methods and systems disclosed herein.

FIG. 11 is a simplified block diagram illustrating an example of data and metadata download in a user interface architecture employing a manifest, according to embodiments of the methods and systems disclosed herein. As part of responding to client proxy 860, application object manager 920 manages the download of runtime data 1010, repository file(s) 1030 and template(s) 1040 from web/application server 910 to display client 810. Thus, as depicted in FIG. 11, application object manager 920 effects the download of runtime data 1010 to display client 810, which then appears at display client 810 as runtime data 1100 as a result of an operation depicted in FIG. 11 as a download runtime data operation 1110. In a similar fashion, application object manager 920 coordinates the download of repository file(s) 1030 and template(s) 1040 to display client 810, which subsequently appear at display client 810 as metadata 1120 (which includes one or more repository file(s) 1130 and one or more template(s) 1140) as a result of a download metadata operation 1150. Alternatively, client proxy 860 can, based on response 1050, perform the requisite operations to retrieve runtime data 1010 and metadata 1020, and so act to effect the download of runtime data 1100 and metadata 1120 to display client 810.

Figure 12:
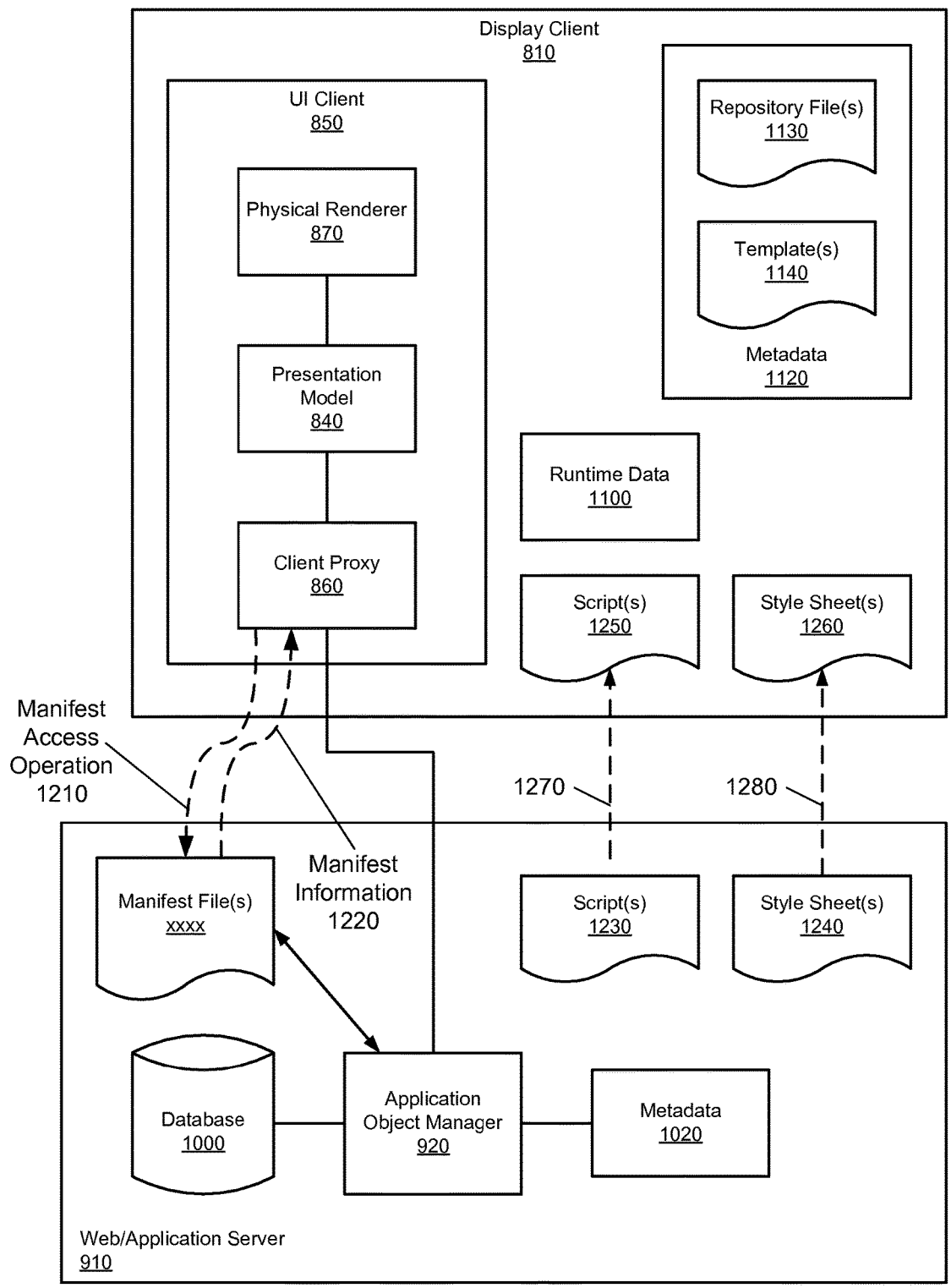
FIG. 12 is a simplified block diagram illustrating an example of manifest operations in a user interface architecture employing a manifest, according to embodiments of the methods and systems disclosed herein.

FIG. 12 is a simplified block diagram illustrating an example of manifest operations in a user interface architecture employing a manifest, according to embodiments of the methods and systems disclosed herein. Display client 810, having received runtime data 1100 and metadata 1120, client proxy 860 (itself having received response 1050) can now interact with the appropriate manifest information stored at web/application server 910 by accessing one or more manifest files (depicted in FIG. 12 as manifest file(s) 1200) via, for example, application object manager 920 (or, alternatively, directly, depending on the design of user interface architecture 800). Such operation are depicted in FIG. 12 as a manifest access operation 1210, which results in the return of manifest information 1220 to client proxy 860. Having retrieved manifest information 1220, client proxy 860 examines manifest information 1220 and effects the download of the requisite information. As depicted in FIG. 12, web/application server 910 also maintains one or more scripts (depicted in FIG. 12 as script(s) 1230) and one or more style sheets (depicted in FIG. 12 as style sheet(s) 1240). Script(s) 1230 can be implemented as, for example, one or more JavaScript files, while style sheet(s) 1240 can be implemented at one or more cascading style sheets (CSS). That being the case, script(s) 1230 and style sheets(s) 1240 are downloaded to display client 810 as script(s) 1250 and style sheet(s) 1260 through a script download operation 1270 and a style sheet download operation 1280, respectively.

Figure 13:
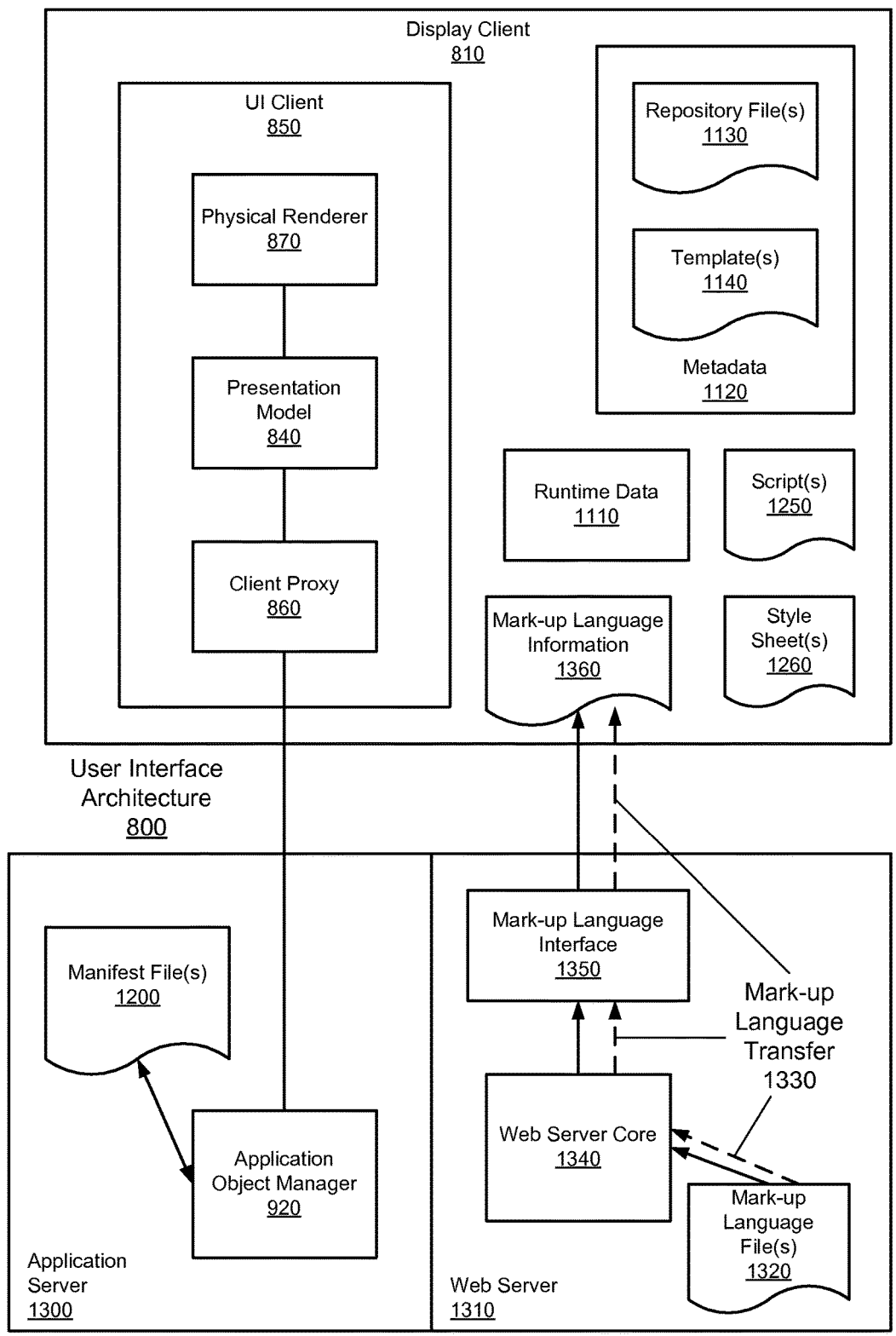
FIG. 13 is a simplified block diagram illustrating an example of mark-up language transfer in a user interface architecture employing a manifest, according to embodiments of the methods and systems disclosed herein.

FIG. 13 is a simplified block diagram illustrating an example of mark-up language transfer in a user interface architecture employing a manifest, according to embodiments of the methods and systems disclosed herein. At this juncture, user interface architecture 800 provides the requisite mark-up language information (e.g., one or more HTML files) by transferring such mark-up language information from the web-application server to the display client. Such an operation is depicted in FIG. 13, where it will be noted that the web/application server depicted in prior and subsequent figures is divided into an application server 1300 and a web server 1310. As part of the response to the request for data received from client proxy 860, web server 1310 provides information from one or more mark-up language files (depicted in FIG. 13 as mark-up language file(s) 1320) to display client 810 via a mark-up language transfer 1330. Mark-up language transfer 1330 transfers information from mark-up language file(s) 1320 to display client 810 via a web server core 1340 and a mark-up language interface 1350. The result of mark-up language transfer 1330 is the availability of mark-up language 1360 at the display client 810.

Figure 14:
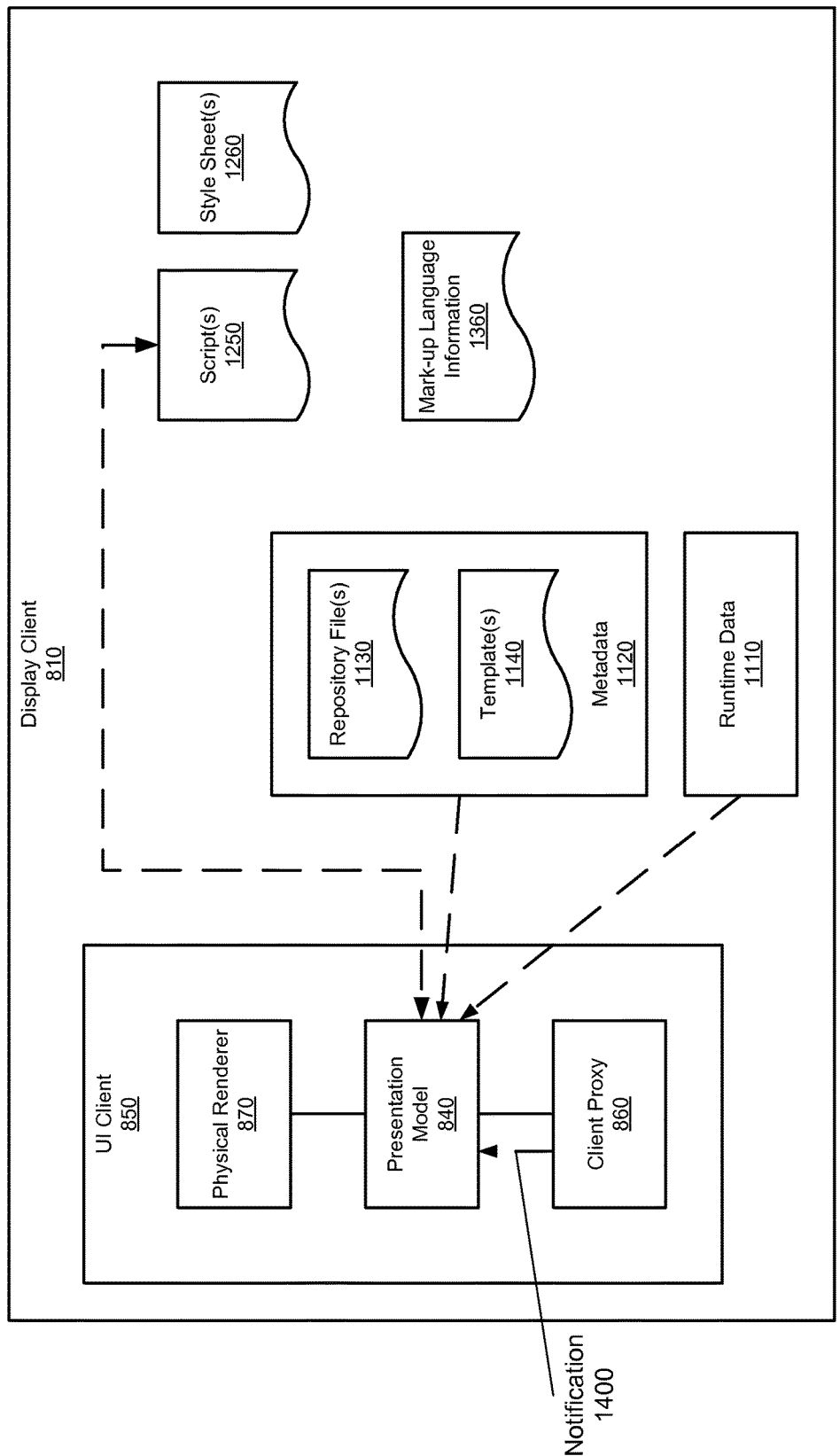
FIG. 14 is a simplified block diagram illustrating an example of the application of business logic to data/metadata in a user interface architecture employing a manifest, according to embodiments of the methods and systems disclosed herein.

FIG. 14 is a simplified block diagram illustrating an example of the application of business logic to data/metadata in a user interface architecture employing a manifest, according to embodiments of the methods and systems disclosed herein. As display client 810 is now in possession of runtime data 1110, metadata 1120, script(s) 1250, style sheet(s) 1260, and mark-up language information 1360, client proxy 860 sends a notification 1400 to presentation model 840, indicating the availability of the aforementioned information. Having received notification 1400, presentation model 840 applies the applicable business logic to runtime data 1110 and metadata 1120, as per script(s) 1250.

Figure 15:
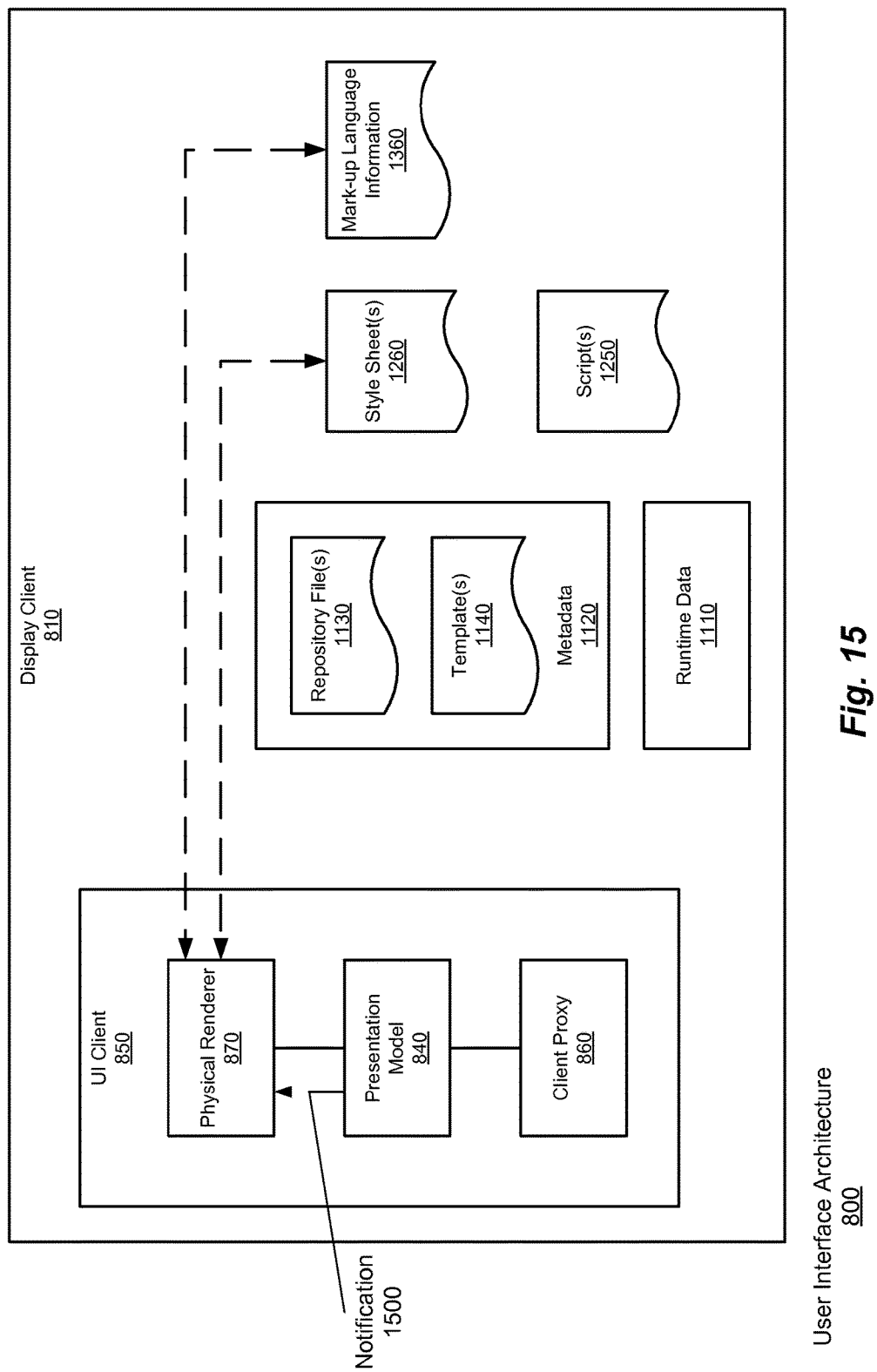
FIG. 15 is a simplified block diagram illustrating an example of the generation of presentation information in a user interface architecture employing a manifest, according to embodiments of the methods and systems disclosed herein.

FIG. 15 is a simplified block diagram illustrating an example of the generation of presentation information in a user interface architecture employing a manifest, according to embodiments of the methods and systems disclosed herein. Having applied business logic as per script(s) 1250 to runtime data 1110 and metadata 1120, presentation model 840 notifies physical renderer 870 that the components of the user interface element to be rendered are now ready for rendering (depicted in FIG. 15 as a notification 1500). As is illustrated in FIG. 15, physical renderer 870 then prepares mark-up language information 1360 for rendering, in part, by a reference to style(s) sheet 1260. These operations result in the generation of mark-up language information for rendering by physical renderer 870 in a user interface window presented by display client 810.

Figure 16:
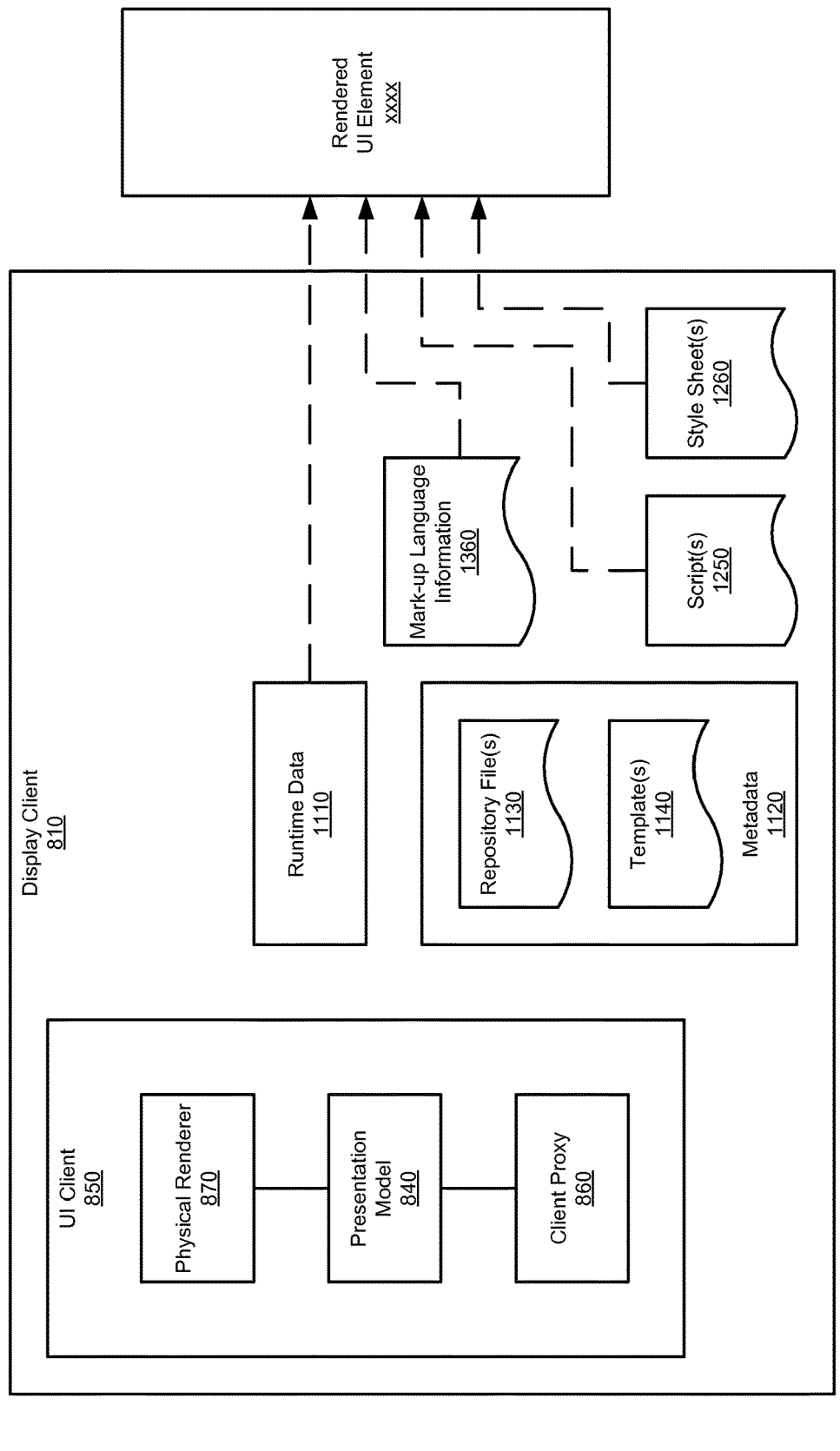
FIG. 16 is a simplified block diagram illustrating an example of the rendering of an interface element in a user interface architecture employing a manifest, according to embodiments of the methods and systems disclosed herein.

FIG. 16 is a simplified block diagram illustrating an example of the rendering of an interface element in a user interface architecture employing a manifest, according to embodiments of the methods and systems disclosed herein. Mark-up language information 1360, having now been finalized, is ready for rendering in a window (not shown) of display client 810. Display client 810 thus rendered mark-up information 1360, embedded with runtime data 1110 script(s) 1250, and style sheet(s) 1260, as a rendered user interface element 1600.

An Example Computing and Network Environment

As described above, the systems described herein can be implemented using a variety of computer systems and networks. Examples of such computing and network environments are described below with reference to FIGS. 17 and 18.

Figure 17:
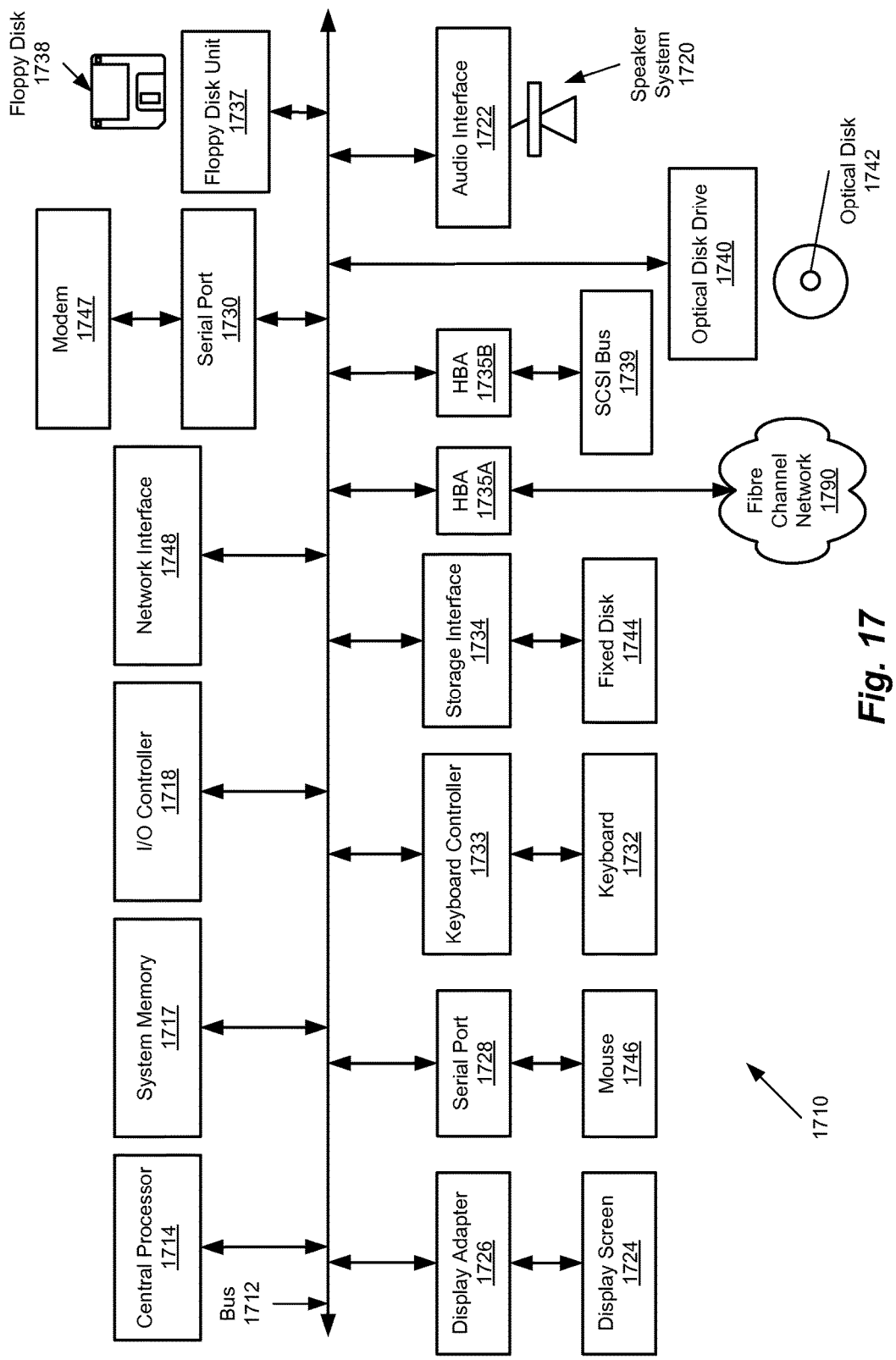
FIG. 17 is a block diagram depicting a computer system suitable for implementing aspects of systems according to embodiments of systems such as those disclosed herein.

FIG. 17 depicts a block diagram of a computer system 1710 suitable for implementing aspects of the present invention. Computer system 1710 includes a bus 1712 which interconnects major subsystems of computer system 1710, such as a central processor 1714, a system memory 1717 (typically RAM, but which may also include ROM, flash RAM, or the like), an input/output controller 1718, an external audio device, such as a speaker system 1720 via an audio output interface 1722, an external device, such as a display screen 1724 via display adapter 1726, serial ports 1728 and 1730, a keyboard 1732 (interfaced with a keyboard controller 1733), a storage interface 1734, a floppy disk drive 1737 operative to receive a floppy disk 1738, a host bus adapter (HBA) interface card 1735A operative to connect with a Fibre Channel network 1790, a host bus adapter (HBA) interface card 1735B operative to connect to a SCSI bus 1739, and an optical disk drive 1740 operative to receive an optical disk 1742. Also included are a mouse 1746 (or other point-and-click device, coupled to bus 1712 via serial port 1728), a modem 1747 (coupled to bus 1712 via serial port 1730), and a network interface 1748 (coupled directly to bus 1712).

Bus 1712 allows data communication between central processor 1714 and system memory 1717, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 1710 are generally stored on and accessed via a computer-readable medium, such as a hard disk drive (e.g., fixed disk 1744), an optical drive (e.g., optical drive 1740), a floppy disk unit 1737, or other storage medium. Additionally, applications can be in the form of electronic signals modulated in accordance with the application and data communication technology when accessed via network modem 1747 or interface 1748.

Storage interface 1734, as with the other storage interfaces of computer system 1710, can connect to a standard computer-readable medium for storage and/or retrieval of information, such as a fixed disk drive 1744. Fixed disk drive 1744 may be a part of computer system 1710 or may be separate and accessed through other interface systems. Modem 1747 may provide a direct connection to a remote server via a telephone link or to the Internet via an internet service provider (ISP). Network interface 1748 may provide a direct connection to a remote server via a direct network link to the Internet via a POP (point of presence). Network interface 1748 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 17 need not be present to practice the present invention. The devices and subsystems can be interconnected in different ways from that shown in FIG. 17. The operation of a computer system such as that shown in FIG. 17 is readily known in the art and is not discussed in detail in this application. Code to implement the present invention can be stored in computer-readable storage media such as one or more of system memory 1717, fixed disk 1744, optical disk 1742, or floppy disk 1738. The operating system provided on computer system 1710 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 18:
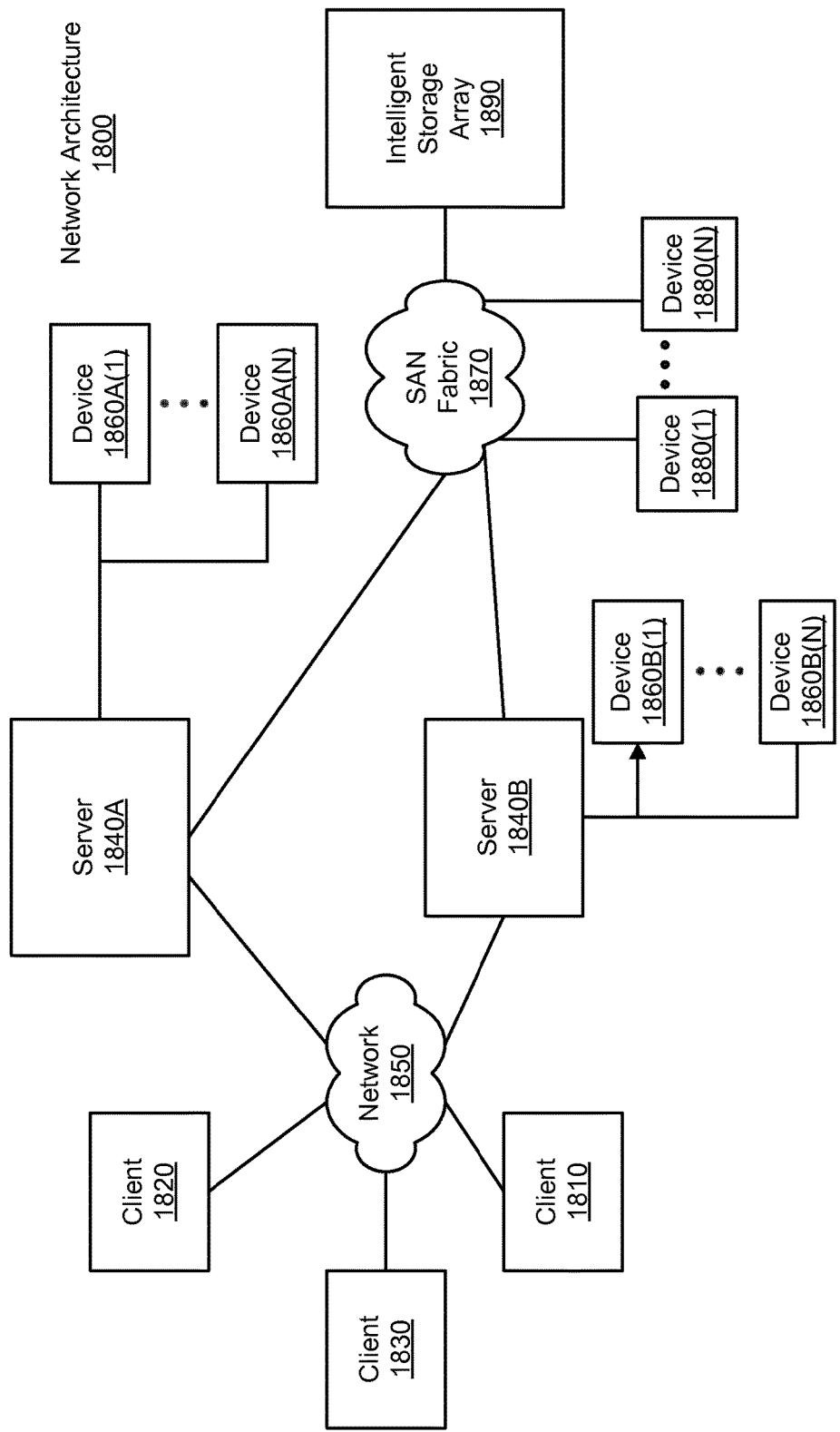
FIG. 18 is a block diagram depicting a network architecture suitable for implementing aspects of systems according to embodiments of systems such as those disclosed herein.

FIG. 18 is a block diagram depicting a network architecture 1800 in which client systems 1810, 1820 and 1830, as well as storage servers 1840A and 1840B (any of which can be implemented using computer system 1810), are coupled to a network 1850. Storage server 1840A is further depicted as having storage devices 1860A(1)-(N) directly attached, and storage server 1840B is depicted with storage devices 1860B(1)-(N) directly attached. Storage servers 1840A and 1840B are also connected to a SAN fabric 1870, although connection to a storage area network is not required for operation of the invention. SAN fabric 1870 supports access to storage devices 1880(1)-(N) by storage servers 1840A and 1840B, and so by client systems 1810, 1820 and 1830 via network 1850. Intelligent storage array 1890 is also shown as an example of a specific storage device accessible via SAN fabric 1870.

With reference to computer system 1810, modem 1847, network interface 1848 or some other method can be used to provide connectivity from each of client computer systems 1810, 1820 and 1830 to network 1850. Client systems 1810, 1820 and 1830 are able to access information on storage server 1840A or 1840B using, for example, a web browser or other client software (not shown). Such a client allows client systems 1810, 1820 and 1830 to access data hosted by storage server 1840A or 1840B or one of storage devices 1860A(1)-(N), 1860B(1)-(N), 1880(1)-(N) or intelligent storage array 1890. FIG. 18 depicts the use of a network such as the Internet for exchanging data, but the present invention is not limited to the Internet or any particular network-based environment.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing describes embodiments including components contained within other components (e.g., the various elements shown as components of computer system 1710). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof, including the specialized systems illustrated in the figures described herein.

The present invention has been described in the context of fully functional computer systems; however, those skilled in the art will appreciate that the present invention is capable of being distributed as a program product in a variety of forms, and that the present invention applies equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment of the invention can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

What is claimed is:

1. A method comprising:
   receiving a request from a computing device, wherein
      the request is received at a manifest engine,
      the manifest engine being configured to evaluate object expressions stored in manifests to
         determine information for rendering user interface elements, and the request comprises
a request for a physical renderer;
obtaining a manifest that includes a plurality of object expressions, wherein
the obtaining is performed by the manifest engine,
the manifest is obtained based at least in part on the request, and
the plurality of object expressions included in the manifest are evaluated to identify one or more script files to be provided to the computing device for rendering the user interface elements, wherein
at least one of the plurality of object expressions indicates a chosen visualization;
evaluating the plurality of object expressions, wherein
the evaluating is performed by the manifest engine,
the evaluating includes evaluating each object expression in the plurality of object expressions until a first object expression evaluates as a true expression; and
generating a physical renderer for rendering one or more user interface elements through the computing device based at least in part on the first object expression, wherein
the physical renderer is generated by the manifest engine and corresponds with the chosen visualization, and
the manifest engine is configured to generate the physical renderer based on a result of the evaluating.

2. The method of claim 1, wherein
the request further comprises
a request for a web template, and
the manifest engine is further configured to generate the web template based on the result of the evaluating.

3. The method of claim 1, further comprising:
receiving a service request, wherein
the service request is a request for a service received at a web engine, and
the service is related to a user interface.

4. The method of claim 3, further comprising:
sending an internal request, wherein
the internal request is sent by the web engine,
the internal request is received by the manifest engine, and
the internal request is for the physical renderer and a web template; and
transferring the physical renderer and the web template.

5. The method of claim 4, wherein the transferring comprises:
sending an internal reply, wherein
the internal reply is sent by the manifest engine, and
the internal reply is received by the web engine.

6. The method of claim 5, wherein
the internal reply comprises
the physical renderer, and
the web template, and
the response corresponds to the response element of the structured data object.

7. A computer system comprising:
a processor;
a computer-readable storage medium coupled to the processor; and
a plurality of instructions, encoded in the computer-readable storage medium and configured to cause the processor to
receive a request from a computing device, wherein
the request is received at a manifest engine,
the manifest engine being configured to evaluate object expressions stored in manifests to determine information for rendering user interface elements, and
the request comprises
a request for a physical renderer,
obtaining a manifest that includes a plurality of object expressions, wherein
the obtaining is performed by the manifest engine,
the manifest is obtained based at least in part on the request, and
the plurality of object expressions included in the manifest are evaluated to identify one or more script files to be provided to the computing device for rendering the user interface elements, wherein
at least one of the plurality of object expressions indicates a chosen visualization;
evaluate the plurality of object expressions, wherein
the evaluating is performed by the manifest engine,
the evaluating includes evaluating each object expression in the plurality of object expressions until a first object expression evaluates as a true expression; and
generate a physical renderer for rendering one or more user interface elements through the computing device based at least in part on the first object expression, wherein
the physical renderer is generated by the manifest engine and corresponds with the chosen visualization, and
the manifest engine is configured to generate the physical renderer based on a result of the evaluating.

8. The computer system of claim 7, wherein
the request further comprises
a request for a web template, and
the manifest engine is further configured to generate the web template based on the result of the evaluating.

9. The computer system of claim 7, wherein the plurality of instructions is further configured to cause the processor to:
receive a service request, wherein
the service request is a request for a service received at a web engine, and
the service is related to a user interface.

10. The computer system of claim 9, wherein the plurality of instructions is further configured to cause the processor to:
send an internal request, wherein
the internal request is sent by the web engine,
the internal request is received by the manifest engine, and
the internal request is for the physical renderer and a web template; and
transfer the physical renderer and the web template.

11. The computer system of claim 10, wherein the plurality of instructions is further configured to cause the processor to transfer further comprise instructions configured to cause the processor to:
send an internal reply, wherein
the internal reply is sent by the manifest engine, and
the internal reply is received by the web engine.

12. The computer system of claim 11, wherein
the internal reply comprises
the physical renderer, and
the web template, and the response corresponds to the response element of the structured data object.

13. A computer program product comprising:
a plurality of instructions, comprising
- a first set of instructions, executable on a computer system, configured to receive a request from a computing device, wherein
  - the request is received at a manifest engine,
  - the manifest engine being configured to evaluate object expressions stored in manifests to determine information for rendering user interface elements, and
  - the request comprises
    - a request for a physical renderer,
- a second set of instructions, executable on the computer system, configured to obtain a manifest that includes a plurality of object expressions, wherein
  - the obtaining is performed by the manifest engine,
  - the manifest is obtained based at least in part on the request, and
  - the plurality of object expressions included in the manifest is evaluated to identify one or more script files to be provided to the computing device for rendering the user interface elements, wherein
  - at least one of the plurality of object expressions indicates a chosen visualization;
- a third set of instructions, executable on the computer system, configured to evaluate the plurality of object expressions, wherein
  - the second set of instructions are executed by the manifest engine,
  - the evaluating includes evaluating each object expression in the plurality of object expressions until a first object expression evaluates as a true expression, and
- a fourth set of instructions, executable on the computer system, configured to generate a physical renderer for rendering one or more user interface elements through the computing device based at least in part on the first object expression, wherein the physical renderer is generated by the manifest engine and corresponds with the chosen visualization, and
  - the manifest engine is configured to generate the physical renderer based on a result of the evaluating; and
- a non-transitory computer-readable storage medium, wherein the instructions are encoded in the computer-readable storage medium.

14. The computer program product of claim 13, wherein the request further comprises
  - a request for a web template, and
  - the manifest engine is further configured to generate the web template based on the result of the evaluating.

15. The computer program product of claim 13, wherein the instructions further comprise:
  - a third set of instructions, executable on the computer system, configured to receive a service request, wherein
    - the service request is a request for a service received at a web engine, and
    - the service is related to a user interface.

16. The computer program product of claim 15, wherein the instructions further comprise:
  - a fourth set of instructions, executable on the computer system, configured to send an internal request, wherein
    - the internal request is sent by the web engine,
    - the internal request is received by the manifest engine, and
    - the internal request is for the physical renderer and a web template; and
  - a fifth set of instructions, executable on the computer system, configured to transfer the physical renderer and the web template.

17. The computer program product of claim 16, wherein the fifth set of instructions comprises:
  - a sixth set of instructions, executable on the computer system, configured to send an internal reply, wherein
    - the internal reply is sent by the manifest engine, and
    - the internal reply is received by the web engine.

18. The computer program product of claim 17, wherein the internal reply comprises
  - the physical renderer, and
  - the web template, and
  - the response corresponds to the response element of the structured data object.

* * * * *